(12) United States Patent
Fu et al.

(10) Patent No.: US 11,780,342 B2
(45) Date of Patent: Oct. 10, 2023

(54) ON-BOARD CHARGING AND DISCHARGING APPARATUS, CHARGING AND DISCHARGING SYSTEM THEREOF, AND ELECTRIC VEHICLE

(71) Applicant: Huawei Digital Power Technologies Co., Ltd., Shenzhen (CN)

(72) Inventors: Dianbo Fu, Shenzhen (CN); Weiping Liu, Dongguan (CN); Shaohua Wang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 10 days.

(21) Appl. No.: 17/707,716

(22) Filed: Mar. 29, 2022

(65) Prior Publication Data

US 2022/0219553 A1    Jul. 14, 2022

Related U.S. Application Data

(63) Continuation of application No. PCT/CN2019/109712, filed on Sep. 30, 2019.

(51) Int. Cl.
*B60L 53/14* (2019.01)
*B60L 53/22* (2019.01)
*H02M 1/42* (2007.01)

(52) U.S. Cl.
CPC .......... *B60L 53/22* (2019.02); *H02M 1/4225* (2013.01); *B60L 2210/14* (2013.01); *B60L 2210/30* (2013.01)

(58) Field of Classification Search
CPC .. B60L 53/22; B60L 2210/30; B60L 2210/14; H02M 1/4225
See application file for complete search history.

(56) References Cited

U.S. PATENT DOCUMENTS 7,889,524 B2 *  2/2011  Lee .................... B60L 53/24
                                                363/124
10,124,680 B1   11/2018  Bartolome et al.
(Continued)

FOREIGN PATENT DOCUMENTS

CN        102130578 A    7/2011
CN        102780262 A    11/2012
(Continued)

*Primary Examiner* — Adi Amrany
*Assistant Examiner* — Esayas G Yeshaw
(74) *Attorney, Agent, or Firm* — Leydig, Voit & Mayer, Ltd.

(57) ABSTRACT

An on-board charging apparatus is provided to implement high-power charging. The on-board charging apparatus includes an alternating current (AC) to direct current (DC) conversion circuit (AC/DC conversion circuit), a power factor correction (PFC) circuit, and a DC/DC conversion circuit. An alternating current terminal of the AC/DC conversion circuit is connected to an alternating current terminal of the PFC circuit. The AC/DC conversion circuit is configured to: receive a first alternating current voltage at the alternating current terminal of the AC/DC conversion circuit, and convert a first component of the first alternating current voltage into a first direct current voltage. The PFC circuit is configured to: convert a second component of the first alternating current voltage into a second direct current voltage. The DC/DC conversion circuit is configured to: convert the first direct current voltage and the second direct current voltage into a third direct current voltage.

15 Claims, 8 Drawing Sheets

(56) References Cited

U.S. PATENT DOCUMENTS

| | | | |
|---|---|---|---|
| 2002/0044468 A1* | 4/2002 | Goodarzi | H02M 1/10 |
| | | | 363/98 |
| 2017/0302160 A1 | 10/2017 | Marcinkiewicz et al. | |
| 2017/0320396 A1 | 11/2017 | Kim et al. | |
| 2019/0126763 A1 | 5/2019 | Najmabadi et al. | |
| 2020/0070757 A1* | 3/2020 | Paquette | H02J 7/14 |
| 2021/0155100 A1* | 5/2021 | Khaligh | H02M 1/4208 |
| 2023/0134008 A1* | 5/2023 | Jabez Dhinagar | H02J 7/0013 |
| | | | 320/107 |

FOREIGN PATENT DOCUMENTS

| | | | |
|---|---|---|---|
| CN | 106134029 A | 11/2016 | |
| CN | 106208141 A | 12/2016 | |
| CN | 106364355 A | 2/2017 | |
| CN | 106655421 A | 5/2017 | |
| CN | 107248814 A | 10/2017 | |
| CN | 107310409 A | 11/2017 | |
| CN | 107579591 A | 1/2018 | |
| CN | 207345546 U | 5/2018 | |
| CN | 108667036 A | 10/2018 | |
| CN | 110040028 A | 7/2019 | |
| WO | 2018107599 A1 | 6/2018 | |

\* cited by examiner

ON-BOARD CHARGING AND DISCHARGING APPARATUS, CHARGING AND DISCHARGING SYSTEM THEREOF, AND ELECTRIC VEHICLE

CROSS-REFERENCE TO RELATED APPLICATIONS

This application is a continuation of International Application No. PCT/CN2019/109712, filed on Sep. 30, 2019, the disclosure of which is hereby incorporated by reference in its entirety.

TECHNICAL FIELD

This application relates to the field of new energy vehicle technologies, and in particular, to an on-board charging and discharging apparatus, a charging and discharging system thereof, and an electric vehicle.

BACKGROUND

With development of technologies in the new energy field, electric vehicles (for example, an electric car/electric vehicle) becomes increasingly popular. Because a fast charging infrastructure is imperfect currently, the electric vehicle is usually provided with an on-board charger (OBC), to improve convenience of charging a power battery in the electric vehicle. The OBC may receive a household alternating current, convert the household alternating current into a direct current charging current, and provide the charging current for the power battery, so that a household alternating current power supply socket can be used to charge the power battery.

The OBC includes a power factor correction (PFC) circuit including an alternating current to direct current (AC/DC) conversion circuit and an energy storage inductor. The AC/DC conversion circuit may convert, into a direct current, the household alternating current received by the OBC, and the power factor correction circuit may be used to improve efficiency of obtaining the direct current through conversion performed by the AC/DC conversion circuit, to improve power conversion efficiency of the OBC. Because a pulsating current with a very large amplitude change flows through the energy storage inductor in an operating period of the power factor correction circuit, the energy storage inductor requires a large magnetic core size and a large winding cable diameter. However, when the energy storage inductor has a large magnetic core size and a large winding cable diameter, the energy storage inductor exerts impact on a volume and a loss of the entire OBC. This is not conducive to improving the power conversion efficiency of the OBC.

Therefore, an existing on-board charging apparatus needs to be further studied.

SUMMARY

Embodiments of this application provide an on-board charging and discharging apparatus, a charging and discharging system thereof, and an electric vehicle, to implement high-power charging.

According to a first aspect, an embodiment of this application provides an on-board charging apparatus. The on-board charging apparatus includes an alternating current to direct current conversion circuit (AC/DC conversion circuit), a power factor correction circuit (PFC circuit), and a direct current to direct current conversion circuit (DC/DC conversion circuit). An alternating current terminal of the AC/DC conversion circuit is connected to an alternating current terminal of the PFC circuit, a direct current terminal of the AC/DC conversion circuit is connected to a first direct current terminal of the DC/DC conversion circuit, and a direct current terminal of the PFC circuit is connected to a second direct current terminal of the DC/DC conversion circuit. The AC/DC conversion circuit may be configured to convert an alternating current voltage into a direct current voltage. The PFC circuit may be configured to: convert an alternating current voltage into a direct current voltage, and improve charging efficiency of the on-board charging apparatus. The DC/DC conversion circuit may be configured to implement conversion between direct current voltages.

The AC/DC conversion circuit is configured to: receive a first alternating current voltage at the alternating current terminal of the AC/DC conversion circuit, and convert a first component of the first alternating current voltage into a first direct current voltage.

The PFC circuit is configured to convert a second component of the first alternating current voltage into a second direct current voltage.

The DC/DC conversion circuit is configured to: convert the first direct current voltage and the second direct current voltage into a third direct current voltage, and output the third direct current voltage to a to-be-charged device.

A voltage value of the first direct current voltage may be less than or equal to a voltage value of the second direct current voltage. A third direct current terminal of the DC/DC conversion circuit may be connected to the to-be-charged device (for example, a power battery pack), and the third direct current terminal of the DC/DC conversion circuit outputs the third direct current voltage, to charge the to-be-charged device. The alternating current terminal of the AC/DC conversion circuit may be connected to an alternating current power supply. The alternating current power supply is configured to output the first alternating current voltage.

Further, the first direct current voltage and the second direct current voltage may have a same positive direction and a same negative direction. That the first direct current voltage and the second direct current voltage have a same positive direction and a same negative direction may mean that if the direct current terminal of the AC/DC conversion circuit is connected to the direct current terminal of the PFC circuit, one end that is of the direct current terminal of the AC/DC conversion circuit and that outputs a high level is connected to one end that is of the direct current terminal of the PFC circuit and that outputs a high level, and one end that is of the direct current terminal of the AC/DC conversion circuit and that outputs a low level is connected to one end that is of the direct current terminal of the PFC circuit and that outputs a low level.

According to the on-board charging apparatus provided in the first aspect, when the on-board charging apparatus is configured to charge the to-be-charged device (for example, a power battery), the alternating current terminal of the AC/DC conversion circuit is connected to the alternating current terminal of the PFC circuit, the AC/DC conversion circuit converts, into the first direct current voltage, the first component of the first alternating current voltage output by the alternating current power supply. The PFC circuit is configured to convert the second component of the first alternating current voltage into the second direct current voltage. The DC/DC conversion circuit is configured to: convert the first direct current voltage and the second direct current voltage into a third direct current voltage available to the to-be-charged device. Therefore, during charging of the to-be-charged device, only the second component of the first alternating current voltage flows through the PFC circuit, and less pulsating currents flow through an inductor in the PFC circuit, to implement high-power charging.

In conclusion, the on-board charging apparatus provided in this embodiment of this application may be used to implement high-power charging.

In a possible design, the PFC circuit includes a boost circuit and a first bus bar, an input terminal of the boost circuit is the alternating current terminal of the PFC circuit, a first output terminal of the boost circuit is connected to a positive terminal of the first bus bar, a second output terminal is connected to a negative terminal of the first bus bar, the positive terminal of the first bus bar is connected to a first endpoint of the second direct current terminal of the DC/DC conversion circuit, and the negative terminal of the first bus bar is connected to a second endpoint of the second direct current terminal of the DC/DC conversion circuit; the boost circuit is configured to convert the second component of the first alternating current voltage into the second direct current voltage; and the first bus bar is configured to: receive the second direct current voltage, and transmit the second direct current voltage to the DC/DC conversion circuit.

In a possible design, the boost circuit includes an energy storage inductor, a first diode, a first switching transistor, and a second switching transistor; and a first terminal of the energy storage inductor is connected to the alternating current terminal of the AC/DC conversion circuit, the first diode is cross-connected between the alternating current terminal of the AC/DC conversion circuit and the positive terminal of the first bus bar, a cathode of the first diode is connected to the positive terminal of the first bus bar, the first switching transistor is cross-connected between a second terminal of the energy storage inductor and the positive terminal of the first bus bar, and the second switching transistor is cross-connected between the second terminal of the energy storage inductor and the negative terminal of the first bus bar.

In a possible design, the AC/DC conversion circuit includes a conversion unit and a second bus bar, an input terminal of the conversion unit is the alternating current terminal of the AC/DC conversion circuit, a first output terminal of the conversion unit is connected to a positive terminal of the second bus bar, a second output terminal is connected to a negative terminal of the second bus bar, the positive terminal of the second bus bar is connected to a first endpoint of the first direct current terminal of the DC/DC conversion circuit, and the negative terminal of the second bus bar is connected to a second endpoint of the first direct current terminal of the DC/DC conversion circuit; the conversion unit is configured to convert the first component of the first alternating current voltage into the first direct current voltage; and the second bus bar is configured to: receive the first direct current voltage, and transmit the first direct current voltage to the DC/DC conversion circuit.

In a possible design, the conversion unit includes a first H-bridge rectifier circuit, configured to convert the first component of the first alternating current voltage into the first direct current voltage.

In a possible design, the first H-bridge rectifier circuit includes a third switching transistor, a fourth switching transistor, a second diode, and a third diode; and the third switching transistor is cross-connected between the alternating current terminal of the AC/DC conversion circuit and the positive terminal of the second bus bar, the fourth switching transistor is cross-connected between the alternating current terminal of the AC/DC conversion circuit and the negative terminal of the second bus bar, the second diode is cross-connected between the alternating current terminal of the AC/DC conversion circuit and the positive terminal of the second bus bar, and the third diode is cross-connected between the alternating current terminal of the AC/DC conversion circuit and the negative terminal of the second bus bar.

In a possible design, the DC/DC conversion circuit includes a second H-bridge rectifier circuit, an isolation transformer, and a third H-bridge rectifier circuit, a primary-side winding of the isolation transformer is coupled to the second H-bridge rectifier circuit, and a secondary-side winding of the isolation transformer is coupled to the third H-bridge rectifier circuit. The second H-bridge rectifier circuit is configured to adjust the first direct current voltage and the second direct current voltage; and the third H-bridge rectifier circuit is configured to: rectify the adjusted first direct current voltage and the adjusted second direct current voltage, and output the third direct current voltage to the to-be-charged device.

According to the foregoing solution, the DC/DC conversion circuit may be implemented by using switching transistors and diodes. In addition, the isolation transformer may be used for isolation between the alternating current power supply and the to-be-charged device.

In a possible design, the on-board charging apparatus provided in the first aspect further includes a controller. The controller may be configured to: control the AC/DC conversion circuit to convert the first component of the first alternating current voltage into the first direct current voltage, control the PFC circuit to convert the second component of the first alternating current voltage into the second direct current voltage, control the DC/DC conversion circuit to convert the first direct current voltage and the second direct current voltage into the third direct current voltage.

In a possible design, the alternating current terminal of the AC/DC conversion circuit is a single-phase alternating current terminal.

According to a second aspect, an embodiment of this application further provides an on-board discharging apparatus. The on-board discharging apparatus includes a direct current to direct current conversion circuit (DC/DC conversion circuit), an alternating current to direct current conversion circuit (AC/DC conversion circuit), and a power factor correction circuit (PFC circuit). A first direct current terminal of the DC/DC conversion circuit is connected to a direct current terminal of the AC/DC conversion circuit, a second direct current terminal is connected to a direct current terminal of the PFC circuit, a third direct current terminal is connected to a to-be-charged device, and an alternating current terminal of the AC/DC conversion circuit and an alternating current terminal of the PFC circuit are connected to current-using equipment.

The DC/DC conversion circuit is configured to: receive a fourth direct current voltage output by the to-be-charged device, convert the fourth direct current voltage into a fifth direct current voltage, and output the fifth direct current voltage to the AC/DC conversion circuit and the PFC circuit.

The AC/DC conversion circuit is configured to: convert the fifth direct current voltage into a first pulsating direct current voltage, and output the first pulsating direct current voltage to the current-using equipment.

The PFC circuit is configured to: convert the fifth direct current voltage into a second pulsating direct current voltage, and output the second pulsating direct current voltage to the current-using equipment.

The first pulsating direct current voltage and the second pulsating direct current voltage have equal voltage values and opposite directions. The alternating current terminal of the AC/DC conversion circuit and the alternating current terminal of the PFC circuit may be connected to the current-using equipment, the alternating current terminal of the AC/DC conversion circuit outputs the first pulsating direct current voltage, the alternating current terminal of the PFC circuit outputs the second pulsating direct current voltage, and the first pulsating direct current voltage and the second pulsating direct current voltage form a second alternating current voltage, to supply power to the current-using equipment. The third direct current terminal of the DC/DC conversion circuit may be connected to the to-be-charged device, and the to-be-charged device is configured to output the fourth direct current voltage.

Further, the first pulsating direct current voltage and the second pulsating direct current voltage may have opposite positive directions and opposite negative directions. That the first pulsating direct current voltage and the second pulsating direct current voltage may have opposite positive directions and opposite negative directions may mean that if the alternating current terminal of the AC/DC conversion circuit is connected to the alternating current terminal of the PFC circuit, one end that is of the alternating current terminal of the AC/DC conversion circuit and that outputs a high level is connected to one end that is of the alternating current terminal of the PFC circuit and that outputs a low level, and one end that is of alternating current terminal of the AC/DC conversion circuit and that outputs a low level is connected to one end that is of the alternating current terminal of the PFC circuit and that outputs a high level.

According to the on-board discharging apparatus provided in the second aspect, when the on-board discharging apparatus is configured to supply power to the current-using equipment by using the to-be-charged device, the DC/DC conversion circuit converts, into the fifth direct current voltage, the fourth direct current voltage output by the to-be-charged device, the alternating current terminal of the AC/DC conversion circuit is connected to the alternating current terminal of the PFC circuit, the AC/DC conversion circuit converts the fifth direct current voltage into a first pulsating direct current voltage available to the current-using equipment, the PFC circuit converts the fifth direct current voltage into a second pulsating direct current voltage available to the current-using equipment, outputs of the AC/DC conversion circuit and the PFC circuit complement each other, the first pulsating direct current voltage forms a positive half cycle voltage of an alternating current voltage, the second pulsating direct current voltage forms a negative half cycle voltage of the alternating current voltage, and the first pulsating direct current voltage and the second pulsating direct current voltage are superposed to form the second alternating current voltage, to supply power to the current-using equipment.

In a possible design, the PFC circuit includes a boost circuit and a first bus bar, an input terminal of the boost circuit is the alternating current terminal of the PFC circuit, a first output terminal of the boost circuit is connected to a positive terminal of the first bus bar, a second output terminal is connected to a negative terminal of the first bus bar, the positive terminal of the first bus bar is connected to a first endpoint of the second direct current terminal of the DC/DC conversion circuit, the negative terminal of the first bus bar is connected to a second endpoint of the second direct current terminal of the DC/DC conversion circuit, the boost circuit is configured to convert the fifth direct current voltage into the second pulsating direct current voltage, and the first bus bar is configured to: receive the fifth direct current voltage, and transmit the fifth direct current voltage to the boost circuit.

In a possible design, the boost circuit includes an energy storage inductor, a first diode, a first switching transistor, and a second switching transistor; and a first terminal of the energy storage inductor is connected to the alternating current terminal of the AC/DC conversion circuit, the first diode is cross-connected between the alternating current terminal of the AC/DC conversion circuit and the positive terminal of the first bus bar, a cathode of the first diode is connected to the positive terminal of the first bus bar, the first switching transistor is cross-connected between a second terminal of the energy storage inductor and the positive terminal of the first bus bar, and the second switching transistor is cross-connected between the second terminal of the energy storage inductor and the negative terminal of the first bus bar.

In a possible design, the AC/DC conversion circuit includes a conversion unit and a second bus bar, an input terminal of the conversion unit is the alternating current terminal of the AC/DC conversion circuit, a first output terminal of the conversion unit is connected to a positive terminal of the second bus bar, a second output terminal is connected to a negative terminal of the second bus bar, the positive terminal of the second bus bar is connected to a first endpoint of the first direct current terminal of the DC/DC conversion circuit, and the negative terminal of the second bus bar is connected to a second endpoint of the first direct current terminal of the DC/DC conversion circuit; the conversion unit is configured to convert the fifth direct current voltage into the first pulsating direct current voltage; and the second bus bar is configured to: receive the fifth direct current voltage, and transmit the fifth direct current voltage to the conversion unit.

In a possible design, the conversion unit includes a first H-bridge rectifier circuit, configured to convert the fifth direct current voltage into a sixth direct current voltage.

In a possible design, the first H-bridge rectifier circuit includes a third switching transistor, a fourth switching transistor, a second diode, and a third diode; and the third switching transistor is cross-connected between the alternating current terminal of the AC/DC conversion circuit and the positive terminal of the second bus bar, the fourth switching transistor is cross-connected between the alternating current terminal of the AC/DC conversion circuit and the negative terminal of the second bus bar, the second diode is cross-connected between the alternating current terminal of the AC/DC conversion circuit and the positive terminal of the second bus bar, and the third diode is cross-connected between the alternating current terminal of the AC/DC conversion circuit and the negative terminal of the second bus bar.

In a possible design, the DC/DC conversion circuit includes a second H-bridge rectifier circuit, an isolation transformer, and a third H-bridge rectifier circuit, a primary-side winding of the isolation transformer is coupled to the second H-bridge rectifier circuit, and a secondary-side winding of the isolation transformer is coupled to the third H-bridge rectifier circuit. The third H-bridge rectifier circuit is configured to adjust the fourth direct current voltage. The second H-bridge rectifier circuit is configured to: rectify the adjusted fourth direct current voltage, and output the fifth direct current voltage to the AC/DC conversion circuit and the PFC circuit.

According to the foregoing solution, the DC/DC conversion circuit may be implemented by using switching transistors and diodes. In addition, the isolation transformer may be further used to isolate the current-using equipment and the to-be-charged device.

In a possible design, the on-board discharging apparatus provided in the second aspect further includes a controller. The controller may be configured to: control the DC/DC conversion circuit to convert the fourth direct current voltage into the fifth direct current voltage, control the AC/DC conversion circuit to convert the fifth direct current voltage into the first pulsating direct current voltage, and control the PFC circuit to convert the fifth direct current voltage into the second pulsating direct current voltage.

In a possible design, the alternating current terminal of the AC/DC conversion circuit and the alternating current terminal of the PFC circuit are single-phase alternating current terminals.

According to a third aspect, an embodiment of this application further provides an on-board charging and discharging apparatus, including an alternating current to direct current conversion circuit (AC/DC conversion circuit), a power factor correction circuit (PFC circuit), and a direct current to direct current conversion circuit (DC/DC conversion circuit). An alternating current terminal of the AC/DC conversion circuit is connected to an alternating current terminal of the PFC circuit, a direct current terminal of the AC/DC conversion circuit is connected to a first direct current terminal of the DC/DC conversion circuit, and a direct current terminal of the PFC circuit is connected to a second direct current terminal of the DC/DC conversion circuit. The alternating current terminal of the AC/DC conversion circuit is connected to an alternating current power supply or current-using equipment, and a third direct current terminal of the DC/DC conversion circuit is connected to a to-be-charged device.

When the on-board charging and discharging apparatus is configured to charge the to-be-charged device, the AC/DC conversion circuit is configured to convert, into a first direct current voltage, a first component of a first alternating current voltage received by the AC/DC conversion circuit; the PFC circuit is configured to convert a second component of the first alternating current voltage into a second direct current voltage; and the DC/DC conversion circuit is configured to: convert the first direct current voltage and the second direct current voltage into a third direct current voltage, and output the third direct current voltage to the to-be-charged device.

When the on-board charging apparatus is configured to discharge electricity to the current-using equipment, the DC/DC conversion circuit is configured to: receive a fourth direct current voltage output by the to-be-charged device, convert the fourth direct current voltage into a fifth direct current voltage, and output the fifth direct current voltage to the AC/DC conversion circuit and the PFC circuit; the AC/DC conversion circuit is configured to: convert the fifth direct current voltage into a first pulsating direct current voltage, and output the first pulsating direct current voltage to the current-using equipment; the PFC circuit is configured to: convert the fifth direct current voltage into a second pulsating direct current voltage, and output the second pulsating direct current voltage to the current-using equipment; and the first pulsating direct current voltage and the second pulsating direct current voltage form a second alternating current voltage.

According to a fourth aspect, an embodiment of this application further provides a charging system, including the on-board charging apparatus provided in any one of the first aspect and the possible designs of the first aspect and/or the on-board discharging apparatus provided in any one of the second aspect and the possible designs of the second aspect.

In a possible design, the charging apparatus is connected between a wind turbine generator system in a wind power generation system and a battery pack, and the charging apparatus is configured to charge the battery pack by using an alternating current generated by the wind turbine generator system.

In a possible design, the charging apparatus is connected between a photovoltaic cell panel in a photovoltaic power generation system and a battery pack, and the charging apparatus is configured to charge the battery pack by using an alternating current generated by the photovoltaic cell panel.

In a possible design, the charging apparatus is connected between an input terminal of an uninterruptible power system and a storage battery, and the charging apparatus is configured to charge the storage battery by using an alternating current received by the uninterruptible power system.

According to a fifth aspect, an embodiment of this application further provides a charging and discharging system. The charging and discharging system includes the on-board charging apparatus provided in any one of the first aspect and the possible designs of the first aspect and/or the on-board discharging apparatus provided in any one of the second aspect and the possible designs of the second aspect.

In addition, for technical effects brought by any possible design manner in the fifth aspect, refer to the technical effects brought by different design manners in the first aspect and/or the second aspect. Details are not described herein again.

According to a sixth aspect, an embodiment of this application further provides an electric vehicle. The electric vehicle includes a power battery pack, the on-board charging apparatus provided in any one of the first aspect and the possible designs of the first aspect, and/or the on-board discharging apparatus provided in any one of the second aspect and the possible designs of the second aspect. The power battery pack is configured to provide power for the electric vehicle, and the on-board charging apparatus is configured to charge the power battery pack.

DESCRIPTION OF EMBODIMENTS

Figure 1:
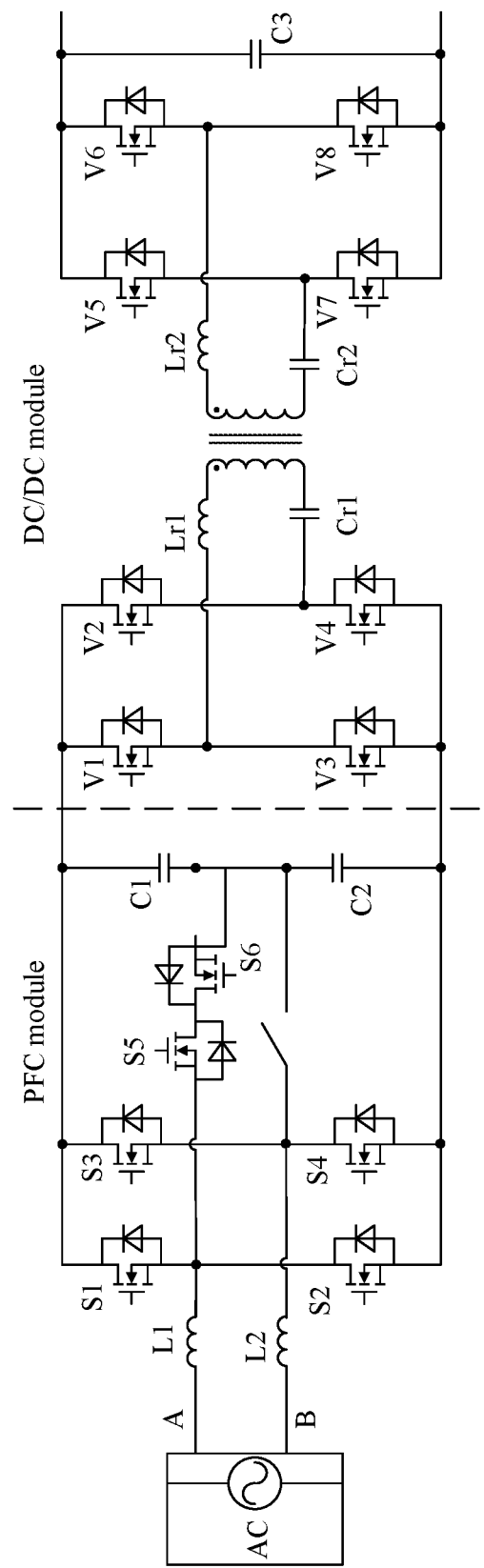
FIG. 1 is a schematic diagram of a structure of an on-board charger according to the conventional technology.

In the conventional technology, a possible structure of an OBC may be shown in FIG. 1. The OBC shown in FIG. 1 includes two parts. A part on a left side of a dashed line is a PFC module, and a part on a right side of the dashed line is a direct current to direct current (DC/DC) module. When the OBC operates in a rectified state and charges a power battery, an alternating current is input from a left side of the PFC module, an alternating current (AC) to direct current (DC) conversion circuit (AC/DC conversion circuit) including switching transistors S1 to S4 in the PFC module is configured to convert the input alternating current into a direct current; an inductor L1 and an inductor L2 in the PFC circuit are configured to store a voltage whose voltage value is less than a potential of a positive terminal of C1 in an alternating current voltage; when a voltage value of a voltage stored by the inductor L1 and the inductor L2 and a voltage value of the alternating current are greater than the potential of the positive terminal of C1, the voltage stored by the inductor L1 and the inductor L2 and the alternating current are converted into a direct current, to improve efficiency of obtaining the direct current through conversion; the DC/DC module is configured to convert, into a charging voltage of the power battery, the direct current obtained through conversion; and two terminals of a capacitor C3 outputs a direct current, to charge the power battery.

Although the OBC shown in FIG. 1 may charge the power battery, in a rectification process, all alternating currents flow through the inductor L1 and the inductor L2 in FIG. 1, and the alternating currents include a pulsating current with a very large amplitude change. When the currents flow through the inductor L1 and the inductor L2, current stability of the direct current obtained through conversion is ensured at a cost of some energy in the inductor L1 and the inductor L2. Therefore, the PFC circuit obtains the direct current with low efficiency, and there is a stricter requirement for a same specification of inductors when more pulsating currents flow through the PFC circuit.

Therefore, the OBC in the conventional technology obtains the direct current through conversion with low efficiency and has an excessively large volume, and is not applicable to high-power charging.

To make the objectives, technical solutions, and advantages of this application clearer, the following further describes this application in detail with reference to the accompanying drawings.

Embodiments of this application provide an on-board charging and discharging apparatus, a charging and discharging system thereof, and an electric vehicle, to implement high-power charging.

Figure 2:
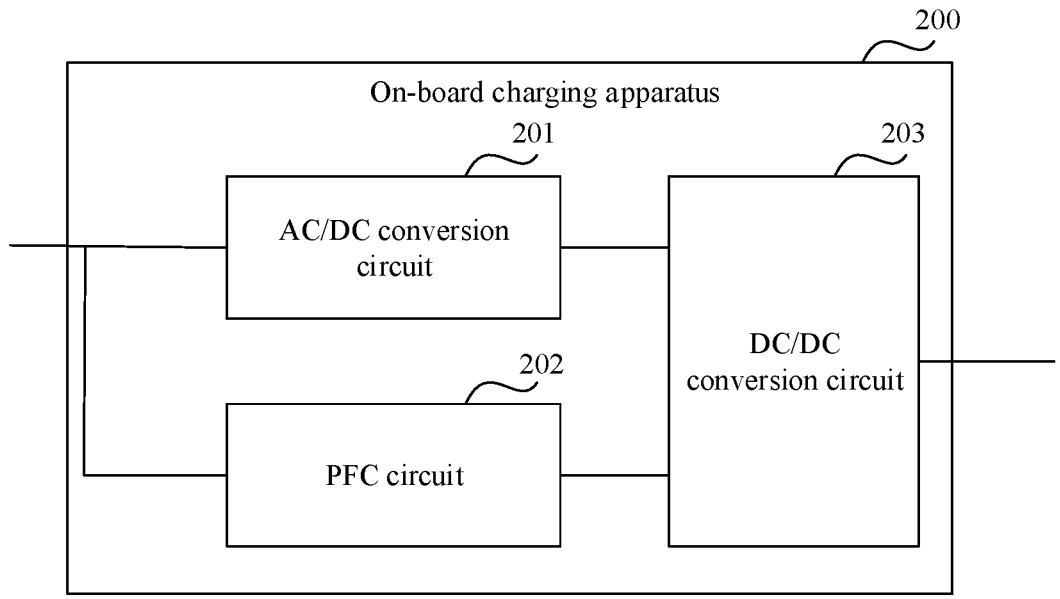
FIG. 2 is a schematic diagram of a structure of a first on-board charging apparatus according to an embodiment of this application.

FIG. 2 is a schematic diagram of a structure of an on-board charging apparatus according to an embodiment of this application. An on-board charging apparatus 200 includes an AC/DC conversion circuit 201, a PFC circuit 202, and a DC/DC conversion circuit 203. An alternating current terminal of the AC/DC conversion circuit 201 is connected to an alternating current terminal of the PFC circuit 202. A direct current terminal of the AC/DC conversion circuit 201 is connected to a first direct current terminal of the DC/DC conversion circuit 203. A direct current terminal of the PFC circuit 202 is connected to a second direct current terminal of the DC/DC conversion circuit 203.

The AC/DC conversion circuit 201 may be configured to: receive a first alternating current voltage at the alternating current terminal of the AC/DC conversion circuit, and convert a first component of the first alternating current voltage into a first direct current voltage; the PFC circuit 202 may be configured to convert a second component of the first alternating current voltage into a second direct current voltage; and the DC/DC conversion circuit 203 may be configured to: convert the first direct current voltage and the second direct current voltage into a third direct current voltage, and output the third direct current voltage to a to-be-charged device.

A voltage value of the first direct current voltage may be less than or equal to a voltage value of the second direct current voltage. Because the second direct current voltage is obtained by the PFC circuit through conversion, based on a characteristic of improving charging efficiency of the on-board charging apparatus based on the PFC circuit, a voltage value of a first voltage output by the PFC circuit is greater than or equal to a voltage value of the first alternating current voltage. A third direct current terminal (which outputs the third direct current voltage) of the DC/DC conversion circuit 203 may be electrically connected to the to-be-charged device (for example, a power battery). In other words, the alternating current terminal of the AC/DC conversion circuit 201 and the alternating current terminal of the PFC circuit 202 are connected and are configured to respectively rectify the first component and the second component of the first alternating current voltage, an output terminal of the AC/DC conversion circuit 201 and an output terminal of the PFC circuit 202 are respectively connected to the first direct current terminal and the second direct current terminal of the DC/DC conversion circuit 203, and the third direct current terminal of the DC/DC conversion circuit 203 is connected to the to-be-charged device and outputs the third direct current voltage, to charge the to-be-charged device.

Further, the first direct current voltage and the second direct current voltage may have a same positive direction and a same negative direction. That the first direct current voltage and the second direct current voltage have a same positive direction and a same negative direction may mean that if the direct current terminal of the AC/DC conversion circuit 201 is connected to the direct current terminal of the PFC circuit 202, one end that is of the direct current terminal of the AC/DC conversion circuit 201 and that outputs a high level is connected to one end that is of the direct current terminal of the PFC circuit 202 and that outputs a high level, and one end that is of the direct current terminal of the AC/DC conversion circuit 201 and that outputs a low level is connected to one end that is of the direct current terminal of the PFC circuit 202 and that outputs a low level.

In addition, in this embodiment of this application, the alternating current terminal of the AC/DC conversion circuit 201 may be electrically connected to an alternating current power supply, and the alternating current power supply is configured to output the first alternating current voltage.

When the on-board charging apparatus 200 is configured to charge the to-be-charged device, the alternating current terminal of the AC/DC conversion circuit 201 and the PFC circuit 202 operate in parallel, the AC/DC conversion circuit 201 converts, into the first direct current voltage, the first component of the first alternating current voltage output by the alternating current power supply; the PFC circuit 202 converts, into the second direct current voltage, the second component of the first alternating current voltage output by the alternating current power supply; the DC/DC conversion circuit 203 is configured to convert the first direct current voltage and the second direct current voltage into a third direct current voltage available to the to-be-charged device; and the third direct current terminal of the DC/DC conversion circuit 203 is connected to the to-be-charged device. The first component and the second component of the first alternating current voltage form the first alternating current voltage. For example, if the first alternating current voltage is 310 V, the first component of the first alternating current voltage may be 155 V, and the second component of the first alternating current voltage may be 155 V.

Figure 3:
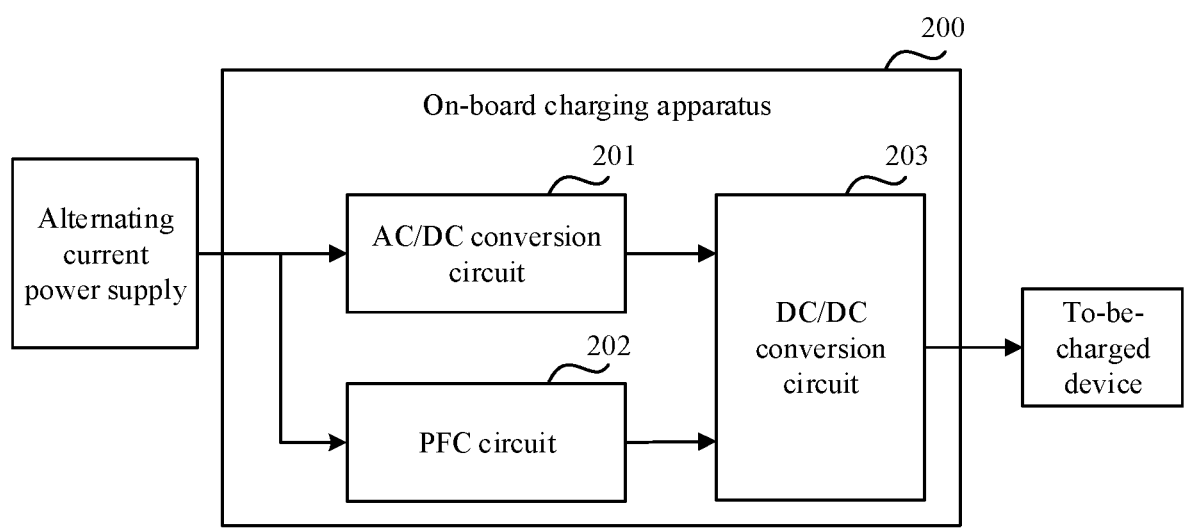
FIG. 3 is a schematic diagram of a structure of a second on-board charging apparatus according to an embodiment of this application.

When the to-be-charged device is charged, an equivalent circuit of the on-board charging apparatus 200 may be shown in FIG. 3. In this case, the alternating current terminal of the AC/DC conversion circuit 201 and the alternating current terminal of the PFC circuit 202 are connected and are used as an input terminal of the on-board charging apparatus 200, and the third direct current terminal of the DC/DC conversion circuit 203 is used as an output terminal of the on-board charging apparatus 200. In a specific implementation, the to-be-charged device may be a power battery, and the power battery may be charged by the alternating current power supply by using the on-board charging apparatus 200 shown in FIG. 3.

It should be understood that, the first direct current voltage obtained after the AC/DC conversion circuit 201 performs alternating current to direct current conversion (rectification) on the first component of the first alternating current voltage and the second direct current voltage obtained after the PFC circuit 202 rectifies the second component of the first alternating current voltage have a large fluctuation, and the voltage value of the first direct current voltage and the voltage value of the second direct current voltage cannot meet a voltage requirement of the to-be-charged device. Therefore, the DC/DC conversion circuit 203 further needs to perform rectification and voltage adjustment processing on the first direct current voltage and the second direct current voltage, to output the third direct current voltage available to the to-be-charged device.

In an actual application, the on-board charging apparatus 200 may be fastened to an electric vehicle. In another implementation, the on-board charging apparatus 200 may be flexibly disposed and removable. In other words, a fixed interface is disposed on the electric vehicle, to connect the on-board charging apparatus 200 and the to-be-charged device. In this case, the on-board charging apparatus 200 may be considered as an apparatus independent of the electric vehicle.

In a specific implementation, the AC/DC conversion circuit 201, the PFC circuit 202, and the DC/DC conversion circuit 203 may include components such as a switching transistor, a diode, an inductor, and a capacitor. Operating states of the AC/DC conversion circuit 201, the PFC circuit 202, and the DC/DC conversion circuit 203 may be implemented by adjusting operating states of these components (for example, the switching transistor).

In this application, a controller may be used to adjust the foregoing operating states. To be specific, the on-board charging apparatus 200 may further include a controller. The controller may be configured to: control the AC/DC conversion circuit 201 to convert, into the first direct current voltage, the first component of the first alternating current voltage output by the alternating current power supply, control the PFC circuit 202 to convert, into the second direct current voltage, the second component of the first alternating current voltage output by the alternating current power supply, and control the DC/DC conversion circuit 203 to convert, into the third direct current voltage, the first direct current voltage and the second direct current voltage. In this case, the on-board charging apparatus 200 is configured to charge the to-be-charged device.

If a switching transistor in each circuit of the on-board charging apparatus 200 is a metal oxide semiconductor (MOS) transistor, the controller may be connected to a gate of the MOS transistor, to control conduction of the MOS transistor, so that the on-board charging apparatus 200 supplies power to the to-be-charged device. If the switching transistor in each circuit of the on-board charging apparatus 200 is a bipolar junction transistor (BJT), the controller may be connected to a base of the BJT, to control conduction of the BJT, so that the on-board charging apparatus 200 supplies power to the to-be-charged device.

In a specific implementation, the controller may be any one of a micro control unit (MCU), a central processing unit (CPU), or a digital signal processor (DSP). Certainly, a specific form of the controller is not limited to the foregoing examples.

The following describes specific structures of the AC/DC conversion circuit 201, the PFC circuit 202, and the DC/DC conversion circuit 203 of the on-board charging apparatus 200.

1. AC/DC Conversion Circuit 201

The alternating current terminal of the AC/DC conversion circuit 201 may be a single-phase alternating current terminal.

Figure 4:
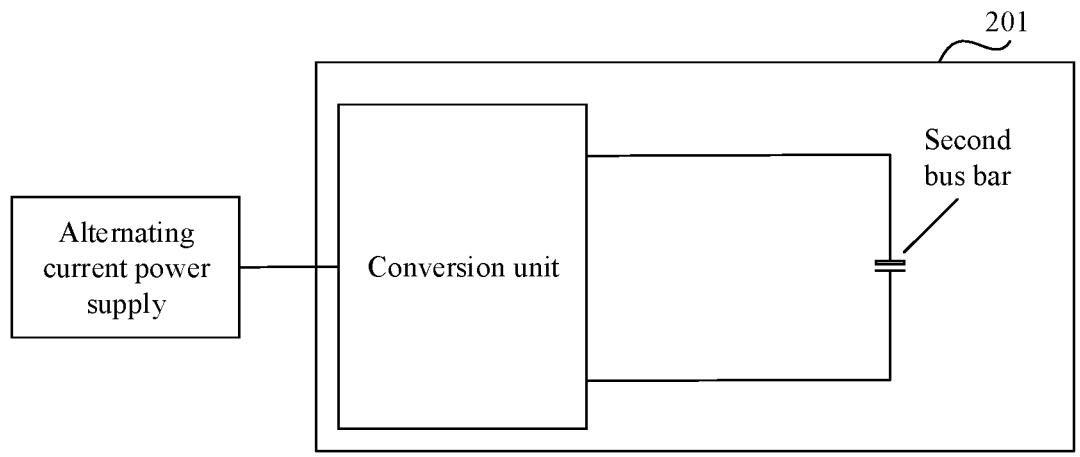
FIG. 4 is a schematic diagram of a structure of a first AC/DC conversion circuit according to an embodiment of this application.

As shown in FIG. 4, the AC/DC conversion circuit 201 includes a conversion unit and a second bus bar. An input terminal of the conversion unit is the alternating current terminal of the AC/DC conversion circuit 201, a first output terminal of the conversion unit is connected to a positive terminal of the second bus bar, a second output terminal is connected to a negative terminal of the second bus bar, the positive terminal of the second bus bar is connected to a first endpoint of the first direct current terminal of the DC/DC conversion circuit 203, and the negative terminal of the second bus bar is connected to a second endpoint of the first direct current terminal of the DC/DC conversion circuit 203.

The conversion unit is configured to: receive, at an input terminal of a conversion circuit, the first alternating current voltage output by the alternating current power supply, convert, into the first direct current voltage, the first component of the first alternating current voltage output by the alternating current power supply, and output the first direct current voltage to the second bus bar.

The second bus bar is configured to: receive the first direct current voltage output by the conversion unit, stabilize the voltage value of the first direct current voltage in a fixed numerical interval, and transfer the stable voltage value to the DC/DC conversion circuit 203.

The following provides a specific structure of the conversion unit.

The conversion unit includes a first H-bridge rectifier circuit, configured to convert the first component of the first alternating current voltage into the first direct current voltage.

In an implementation, the first H-bridge rectifier circuit includes a diode.

In another implementation, the first H-bridge rectifier circuit includes a third switching transistor, a fourth switching transistor, a second diode, and a third diode.

The third switching transistor is cross-connected between the alternating current terminal of the AC/DC conversion circuit 201 and the positive terminal of the second bus bar, the fourth switching transistor is cross-connected between the alternating current terminal of the AC/DC conversion circuit 201 and the negative terminal of the second bus bar, the second diode is cross-connected between the alternating current terminal of the AC/DC conversion circuit 201 and the positive terminal of the second bus bar, and the third diode is cross-connected between the alternating current terminal of the AC/DC conversion circuit 201 and the negative terminal of the second bus bar.

For ease of understanding, the following separately provides specific examples of two structures of the conversion unit.

Figure 5:
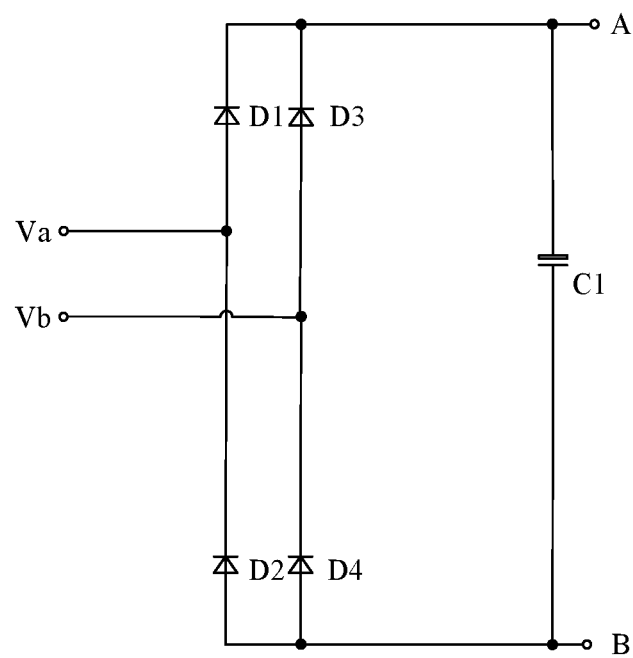
FIG. 5 is a schematic diagram of a structure of a second AC/DC conversion circuit according to an embodiment of this application.

FIG. 5 is a schematic diagram of a structure of a conversion unit according to an embodiment of this application. In FIG. 5, diodes D1, D2, D3, and D4 form the first H-bridge rectifier circuit, C1 may be considered as the second bus bar, Va may be considered as a first alternating current endpoint of the alternating current terminal of the AC/DC conversion circuit 201, Vb may be considered as a second alternating current endpoint of the alternating current terminal of the AC/DC conversion circuit 201, and the first alternating current endpoint and the second alternating current endpoint are connected to two output terminals of the alternating current power supply.

A connection relationship between components in the conversion unit shown in FIG. 5 may be as follows: A cathode of D1 and a cathode of D3 are connected to a positive terminal of C, and an anode of D2 and an anode of D4 are connected to a negative terminal of C.

When single-phase rectification is implemented by using the conversion unit shown in FIG. 5, Va and Vb are used as single-phase input terminals, A and B are used as output terminals, energy is transmitted from left to right, and a single-phase alternating current input from a left side is converted into a direct current for outputting.

Figure 6:
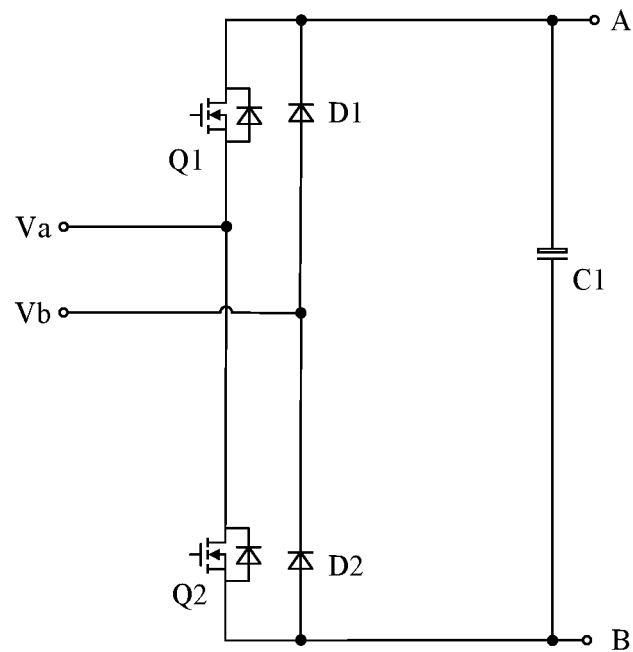
FIG. 6 is a schematic diagram of a structure of a third AC/DC conversion circuit according to an embodiment of this application.

FIG. 6 is a schematic diagram of a structure of another conversion unit according to an embodiment of this application. In FIG. 6, MOS transistors Q1 and Q2 form a first rectifier bridge arm, diodes D1 and D2 form a second rectifier bridge arm, C1 may be considered as the second bus bar, Va may be considered as a first alternating current endpoint of the alternating current terminal of the AC/DC conversion circuit 201, Vb may be considered as a second alternating current endpoint of the alternating current terminal of the AC/DC conversion circuit 201, and the first alternating current endpoint and the second alternating current endpoint are connected to two output terminals of the alternating current power supply.

A connection relationship between components in the conversion unit shown in FIG. 6 may be as follows: A cathode of D1 and a drain of Q1 are connected to a positive terminal of C, and an anode of D2 and a source of Q2 are connected to a negative terminal of C.

When single-phase rectification is implemented by using the conversion unit shown in FIG. 6, Va and Vb are used as single-phase input terminals, A and B are used as output terminals, energy is transmitted from left to right, and a single-phase alternating current input from a left side is converted into a direct current for outputting.

Certainly, the foregoing descriptions of the structures of the conversion unit are merely an example. In an actual application, the conversion unit may alternatively be of another structure. For example, the first H-bridge rectifier unit included in the conversion unit may be a single-phase fully-controlled bridge circuit, and is configured to implement single-phase rectification.

In an actual application, conduction of a switching transistor in the first H-bridge rectifier circuit may be controlled by the controller.

2. PFC Circuit 202

Figure 7:
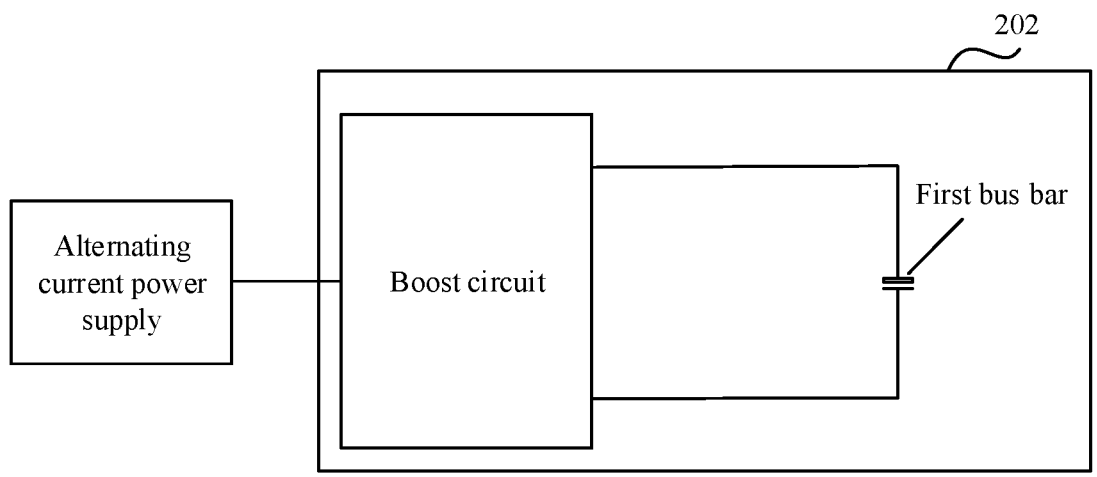
FIG. 7 is a schematic diagram of a structure of a first PFC circuit according to an embodiment of this application.

As shown in FIG. 7, the PFC circuit may include a boost circuit and a first bus bar, an input terminal of the boost circuit is an input terminal of the PFC circuit, a first output terminal of the boost circuit is connected to a positive terminal of the first bus bar, a second output terminal is connected to a negative terminal of the first bus bar, the positive terminal of the first bus bar is connected to a first endpoint of the second direct current terminal of the DC/DC conversion circuit 203, and the negative terminal of the first bus bar is connected to a second endpoint of the second direct current terminal of the DC/DC conversion circuit.

The boost circuit is configured to: convert, into the second direct current voltage, a voltage that is in the first alternating current voltage and that is less than a potential of a positive terminal of the first bus bar and a voltage that is greater than or equal to a voltage of the first bus bar, and output the second direct current voltage to the first bus bar.

The first bus bar is configured to: receive the second direct current voltage output by the boost circuit, stabilize the voltage value of the second direct current voltage in a fixed numerical interval, and transfer the stable voltage value to the DC/DC conversion circuit 203.

The following provides a specific structure of the boost circuit.

The boost circuit may include an energy storage inductor, a first diode, a first switching transistor, and a second switching transistor.

A first terminal of the energy storage inductor is connected to the alternating current terminal of the AC/DC conversion circuit 201, the first diode is cross-connected between the alternating current terminal of the AC/DC conversion circuit 201 and the positive terminal of the first bus bar, a cathode of the first diode is connected to the positive terminal of the first bus bar, the first switching transistor is cross-connected between a second terminal of the energy storage inductor and the positive terminal of the first bus bar, and the second switching transistor is cross-connected between the second terminal of the energy storage inductor and the negative terminal of the first bus bar.

For ease of understanding, the following provides a specific example of the structure of the boost circuit.

Figure 8:
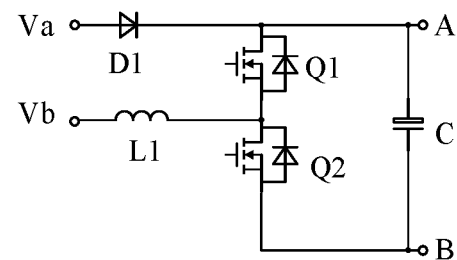
FIG. 8 is a schematic diagram of a structure of a second PFC circuit according to an embodiment of this application.

FIG. 8 is a schematic diagram of a structure of a boost circuit according to an embodiment of this application. In FIG. 8, L1 may be considered as the energy storage inductor, D1 may be considered as the first diode, Q1 may be considered as the first switching transistor, Q2 may be considered as the second switching transistor, C may be considered as the first bus bar, Va may be considered as a first alternating current endpoint of the alternating current terminal of the PFC circuit 202, and Vb may be considered as a second alternating current endpoint of the alternating current terminal of the PFC circuit 202.

When the boost circuit shown in FIG. 8 charges the to-be-charged device, there may be two phases: energy storage and single-phase rectification.

When the boost circuit shown in FIG. 8 implements energy storage, Va and Vb are used as single-phase input terminals, and a voltage that is in the first alternating current voltage and that is less than a potential of a positive terminal of the second bus bar and a potential of a positive terminal of the first bus bar is stored in L1 through a path including D1, Q1, and L1.

When the boost circuit shown in FIG. 8 implements single-phase rectification, Va and Vb are used as single-phase input terminals, A and B are used as output terminals, energy is transmitted from left to right through a path including D1, C, Q2, and L1, and a part of a single-phase alternating current input from a left side and a voltage stored by the energy storage inductor are converted into a direct current for outputting.

When the boost circuit shown in FIG. 8 implements single-phase rectification, energy converted by the boost circuit is energy obtained by superposing the voltage of the energy storage inductor and the single-phase alternating current, and a voltage value of the output direct current is greater than or equal to a voltage value of the single-phase alternating current.

3. DC/DC Conversion Circuit 203

The DC/DC conversion circuit 203 may include a second H-bridge rectifier circuit, an isolation transformer, and a third H-bridge rectifier circuit, a primary-side winding of the isolation transformer is coupled to the second H-bridge rectifier circuit, and a secondary-side winding of the isolation transformer is coupled to the third H-bridge rectifier circuit.

The second H-bridge rectifier circuit includes a switching transistor, and is configured to adjust the first direct current voltage and the second direct current voltage. The third H-bridge rectifier circuit includes a switching transistor, and is configured to: rectify the adjusted first direct current voltage and the adjusted second direct current voltage, and output the third direct current voltage.

In this embodiment of this application, the DC/DC conversion circuit 203 may use an existing structure, that is, includes two H-bridge rectifier circuits and one isolation transformer. The first bridge arm of the second H-bridge rectifier circuit may be used as the first direct current terminal of the DC/DC conversion circuit 203, and is connected to two terminals of the second bus bar in the AC/DC conversion circuit 201. A second bridge arm of the second H-bridge rectifier circuit may be used as the second direct current terminal of the DC/DC conversion circuit 203, and is connected to two terminals of the first bus bar in the PFC circuit 202 (in this case, voltages at the two terminals of the first bus bar are second direct current voltages, and voltages at the two terminals of the second bus bar are first direct current voltages).

The DC/DC conversion circuit 203 may perform voltage adjustment and rectification processing on the first direct current voltage and the second direct current voltage, and may further isolate the alternating current power supply and the to-be-charged device.

Figure 9:
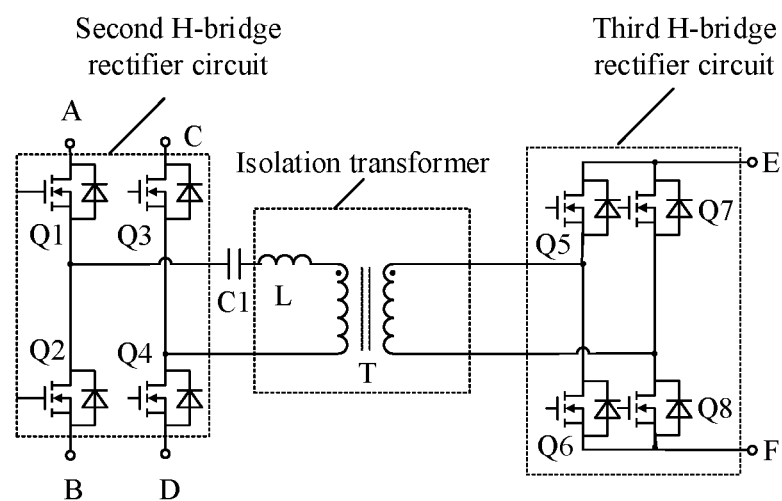
FIG. 9 is a schematic diagram of a structure of a DC/DC conversion circuit according to an embodiment of this application.

For example, a structure of the DC/DC conversion circuit 203 may be shown in FIG. 9. In FIG. 9, A and B are used as first direct current terminals, C and D are used as second direct current terminals, E and F are used as third direct current terminals, a MOS transistor Q1/Q2/Q3/Q4 forms the second H-bridge rectifier circuit, a MOS transistor Q5/Q6/Q7/Q8 forms the third H-bridge rectifier circuit, and L, C1, and T form the isolation transformer. L and T each may be a discrete structure, or L and T may be magnetically integrated.

When the on-board charging apparatus 200 is configured to charge the to-be-charged device, A and B are used as first direct current terminals and are configured to receive the first direct current voltage output by the AC/DC conversion circuit 201, C and D are used as second direct current terminals and are configured to receive the second direct current voltage output by the PFC circuit 202, and E and F are used as third direct current terminals, connected to the to-be-charged device, and output the third direct current voltage, to charge the to-be-charged device.

Figure 10:
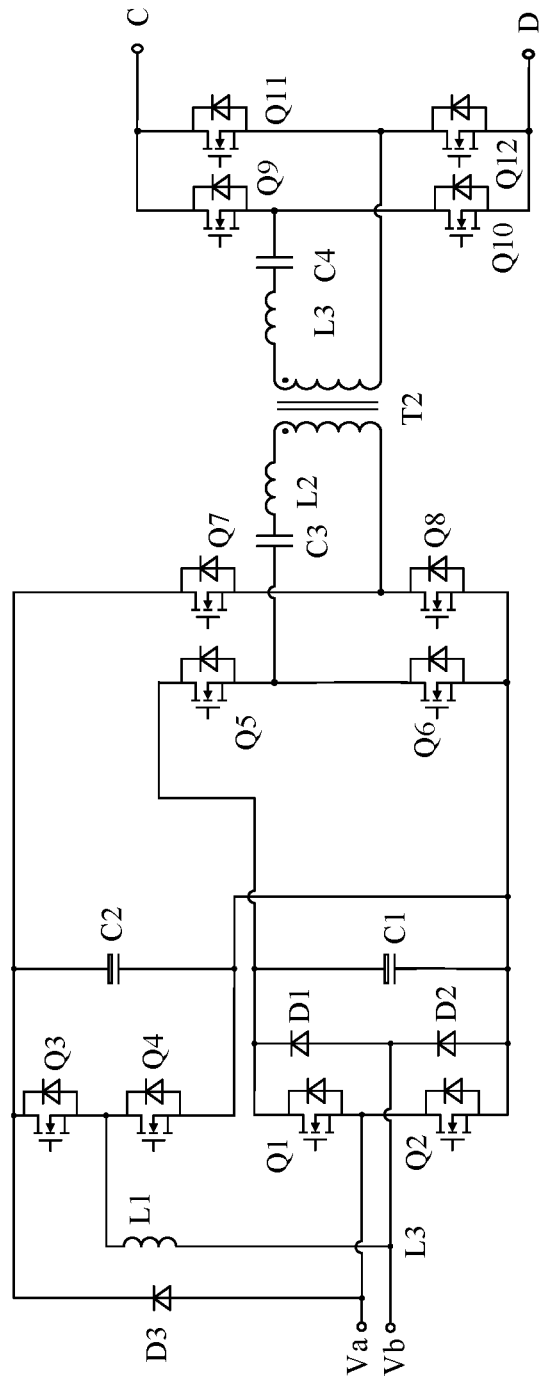
FIG. 10 is a schematic diagram of a structure of a third on-board charging apparatus or a first on-board discharging apparatus according to an embodiment of this application.

With reference to the foregoing description, for example, an on-board charging apparatus provided in an embodiment of this application may be shown in FIG. 10.

The AC/DC conversion circuit includes diodes D1 and D2, MOS transistors Q1 and Q2, and direct current bus bar C1. An alternating current side is connected to the alternating current power supply, and parasitic diodes of Q1 and Q2 and the diodes D1 and D2 form the first H-bridge rectifier circuit. A drain of Q1 and a cathode of D1 are connected to a positive terminal of C1, and a source of Q2 and an anode of D2 are connected to a negative terminal of C1. Gates of the MOS transistors are all connected to an external control circuit (or a controller). The control circuit implements a corresponding function of the on-board charging apparatus by controlling conduction of the MOS transistors.

The PFC circuit includes a diode D3, MOS transistors Q3 and Q4, an inductor L1, and a direct current bus bar C2. A drain of Q3 and a cathode of D3 are connected to a positive terminal of C2, a source is connected to a first terminal of L1 and a drain of Q4, and a source of Q4 is connected to a negative terminal of C2. Gates of the MOS transistors are all connected to an external control circuit (or a controller). The control circuit implements a corresponding function of the on-board charging apparatus by controlling conduction of the MOS transistors.

It is easily learned that the alternating current terminal of the AC/DC conversion circuit is connected to the alternating current power supply, the alternating current terminal of the PFC circuit is connected to the alternating current terminal of the AC/DC conversion circuit, and the direct current terminal of the AC/DC conversion circuit and the direct current terminal of the PFC circuit are respectively connected to the first direct current terminal and the second direct current terminal of the DC/DC conversion circuit.

In the DC/DC conversion circuit, the MOS transistor Q5/Q6/Q7/Q8 forms the second H-bridge rectifier circuit, a drain of Q5 is connected to the positive terminal of C1, a source of Q6 is connected to the negative terminal of C1, a drain of Q7 is connected to the positive terminal of C2, a source of Q8 is connected to the negative terminal of C2 (equivalent to grounding), an intermediate node between Q5 and Q6 is connected to C3, C3 is connected to L2, L2 is connected to one terminal of a primary-side winding of T2, and an intermediate node between Q7 and Q8 is connected to the other terminal of the primary-side winding of T2. A MOS transistor Q9/Q10/Q11/Q12 forms the third H-bridge rectifier circuit, an intermediate node between Q9 and Q10 is connected to C4, C4 is connected to L3, L3 is connected to one terminal of a secondary-side winding of T2, and an intermediate node that connects Q10 and Q12 is connected to the other terminal of the secondary-side winding of T2. A drain of Q9 and a drain of Q11 are connected to a positive electrode of the power battery, and a source of Q10 and a source of Q12 are connected to a negative electrode of the power battery.

When the on-board charging apparatus shown in FIG. 10 is used to charge the to-be-charged device (the power battery), Va and Vb are used as input terminals of the on-board charging apparatus, and C and D are used as output terminals of the on-board charging apparatus and are connected to the power battery.

The alternating current power supply is connected to the AC/DC conversion circuit and the PFC circuit, and the AC/DC conversion circuit and the PFC circuit are connected to the DC/DC conversion circuit. In the AC/DC conversion circuit, Q1, Q2, D1, and D2 are used as rectifiers to rectify a first component whose voltage value is greater than or equal to the potential of the positive terminal of C1 in the first alternating current voltage output by the alternating current power supply, to output the first direct current voltage. In the PFC circuit, when the voltage value of the first alternating current voltage output by the alternating current power supply is less than the potential of the positive terminal of C2, the voltage output by the alternating current power supply is stored in L1 by using D3, Q3, and L1. When a sum of the voltage value of the first alternating current voltage output by the alternating current power supply and voltage values of voltages at two terminals of L1 is greater than the potential of the positive terminal of C2, a second component including the voltage output by the first alternating current voltage and the voltages at the two terminals of L1 is rectified, to output the second direct current voltage.

During charging of the to-be-charged device, only the second component of the first alternating current voltage passes through the PFC circuit in a direct current manner, the AC/DC conversion circuit may directly convert the first component whose voltage value is greater than the potential of the positive terminal of C1 in the first alternating current voltage output by the alternating current power supply, and there is high conversion efficiency. Therefore, in a process in which the on-board charging apparatus shown in FIG. 10 charges the to-be-charged device, efficiency of obtaining the direct current through conversion is improved, and the on-board charging apparatus is applicable to high-power charging.

Based on a same inventive concept, an embodiment of this application further provides an on-boarding discharging apparatus.

Figure 11:
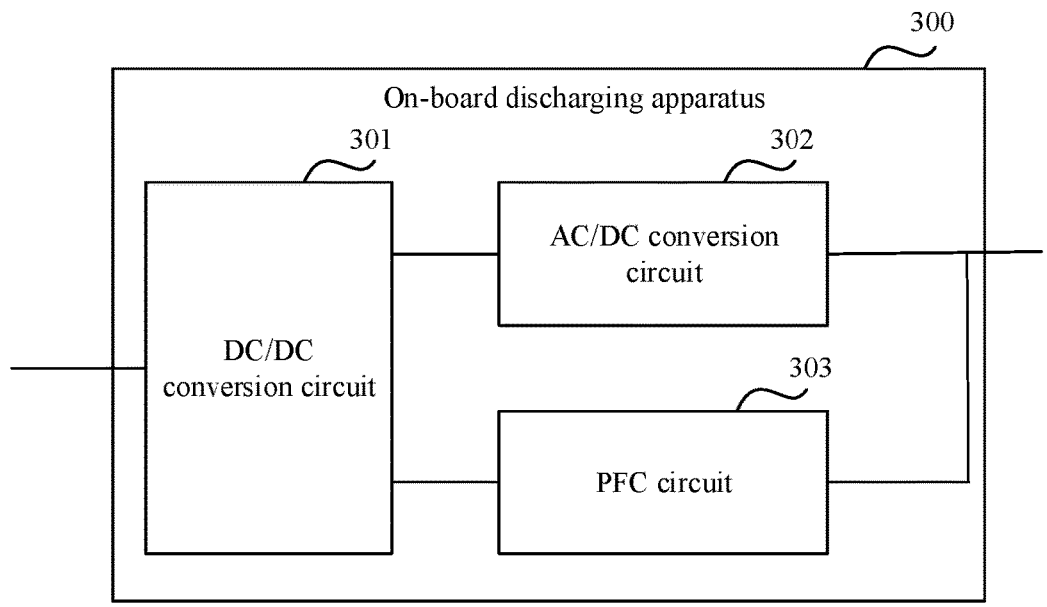
FIG. 11 is a schematic diagram of a structure of a second on-board discharging apparatus according to an embodiment of this application.

FIG. 11 is a schematic diagram of a structure of an on-board discharging apparatus according to an embodiment of this application. An on-board discharging apparatus 300 includes a direct current to direct current conversion circuit 301 (DC/DC conversion circuit 301), an alternating current to direct current conversion circuit 302 (AC/DC conversion circuit 302), and a power factor correction circuit 303 (PFC circuit 303). A first direct current terminal of the DC/DC conversion circuit 301 is connected to a direct current terminal of the AC/DC conversion circuit 302. A second direct current terminal is connected to a direct current terminal of the PFC circuit 303, and a third direct current terminal is connected to a to-be-charged device. An alternating current terminal of the AC/DC conversion circuit 302 and an alternating current terminal of the PFC circuit 303 are connected to current-using equipment.

The DC/DC conversion circuit 301 may be configured to: receive a fourth direct current voltage output by the to-be-charged device, convert the fourth direct current voltage into a fifth direct current voltage, and output the fifth direct current voltage to the AC/DC conversion circuit 302 and the PFC circuit 303. The AC/DC conversion circuit 302 may be configured to convert the fifth direct current voltage into a first pulsating direct current voltage. The PFC circuit 303 may be configured to convert the fifth direct current voltage into a second pulsating direct current voltage.

If the first pulsating direct current voltage and the second pulsating direct current voltage have equal voltage values, the alternating current terminal of the AC/DC conversion circuit 302 may be electrically connected to the current-using equipment, and the alternating current terminal of the PFC circuit 303 is also electrically connected to the current-using equipment. In other words, the AC/DC conversion circuit 302 and the PFC circuit 303 respectively rectify the fifth direct current voltage, the alternating current terminals are respectively connected to the current-using equipment and output the first pulsating direct current voltage and the second pulsating direct current voltage, to supply power to the current-using equipment.

Further, the first pulsating direct current voltage and the second pulsating direct current voltage have opposite positive directions and opposite negative directions. That the first pulsating direct current voltage and the second pulsating direct current voltage have opposite positive directions and opposite negative directions means that both the alternating current terminal of the AC/DC conversion circuit 302 and the alternating current terminal of the PFC circuit 303 are connected to the current-using equipment; one end that is of the alternating current terminal of the AC/DC conversion circuit 302 and that outputs a high level is connected to a first terminal of the current-using equipment, and one end that outputs a low level is connected to a second terminal of the current-using equipment; and similarly, one end that is of the alternating current terminal of the PFC circuit 303 and that outputs a high level is connected to the second terminal of the current-using equipment, and one end that outputs a low level is connected to the first terminal of the current-using equipment. The two terminals of the current-using equipment may receive a second alternating current voltage including the first pulsating direct current voltage and the second pulsating direct current voltage that have a same voltage value and opposite directions.

Outputs of the alternating current terminal of the AC/DC conversion circuit 302 and the alternating current terminal of the PFC circuit 303 complement each other, the alternating current terminal of the AC/DC conversion circuit 302 and the alternating current terminal of the PFC circuit 303 respectively output the first pulsating direct current voltage and the second pulsating direct current voltage for same duration, the first pulsating direct current voltage may form a positive half cycle voltage of the second alternating current voltage, the second pulsating direct current voltage may form a negative half cycle voltage of the second alternating current voltage, the first pulsating direct current voltage and the second pulsating direct current voltage may be superposed to form a second alternating current voltage with a complete period, and the alternating current terminal of the AC/DC conversion circuit 302 and the alternating current terminal of the PFC circuit 303 are connected to the current-using equipment, to supply power to the current-using equipment.

In addition, in this embodiment of this application, the third direct current terminal of the DC/DC conversion circuit 301 may be electrically connected to the to-be-charged device, the to-be-charged device may be configured to output the fourth direct current voltage, and the to-be-charged device may be a power battery. The alternating current terminal of the AC/DC conversion circuit 302 and the alternating current terminal of the PFC circuit 303 may be electrically connected to the current-using equipment, and a rated voltage of the current-using equipment may be the second alternating current voltage. The current-using equipment may be a terminal such as an induction cooker, a rice cooker, a mobile phone, a navigation device, a television, or a laptop computer.

When the on-board discharging apparatus 300 is configured to supply power to the current-using equipment by using the to-be-charged device, the DC/DC conversion circuit 301 converts, into the fifth direct current voltage, the fourth direct current voltage output by the to-be-charged device; the AC/DC conversion circuit 302 is configured to convert the fifth direct current voltage into a first pulsating direct current voltage available to the current-using equipment; and the PFC circuit 303 is configured to convert the fifth direct current voltage into a second pulsating direct current voltage available to the current-using equipment. Both the alternating current terminal of the AC/DC conversion circuit 302 and the alternating current terminal of the PFC circuit 303 are connected to the current-using equipment. The first pulsating direct current voltage and the second pulsating direct current voltage form the second alternating current voltage. For example, the first pulsating direct current voltage is +310 V, the second pulsating direct current voltage is −310 V, and the second alternating current voltage is an alternating current voltage whose amplitude is 310 V.

Figure 12:
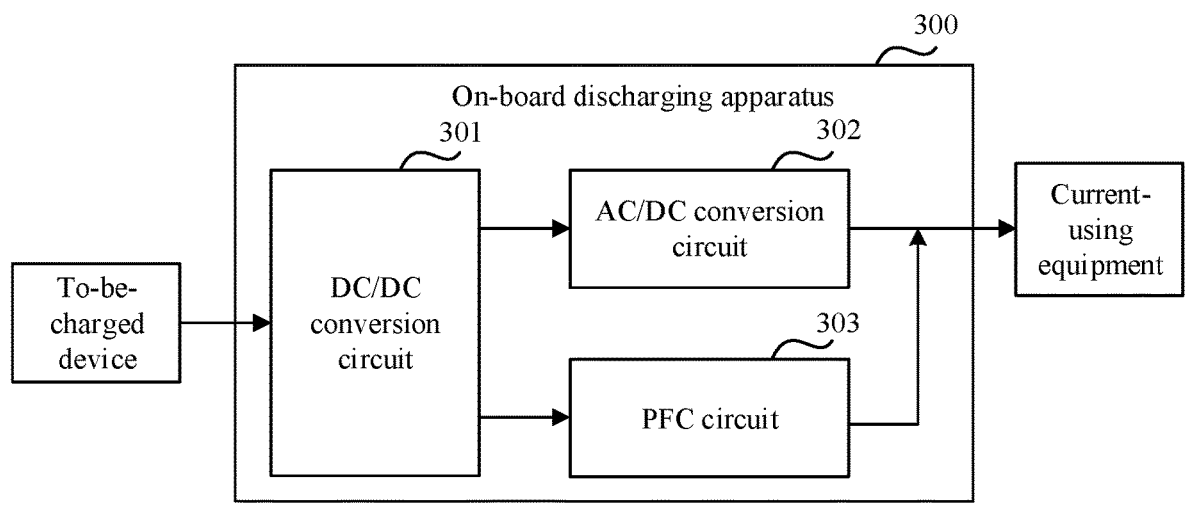
FIG. 12 is a schematic diagram of a structure of a third on-board discharging apparatus according to an embodiment of this application.

When power is supplied to the current-using equipment, an equivalent circuit of the on-board discharging apparatus 300 may be shown in FIG. 12. In this case, the third direct current terminal of the DC/DC conversion circuit 301 is used as an input terminal of the on-board discharging apparatus 300, and the alternating current terminal of the AC/DC conversion circuit 302 and the alternating current terminal of the PFC circuit 303 are connected in parallel and then are used as an output terminal of the on-board discharging apparatus 300. In a specific implementation, the to-be-charged device may be a power battery, and the on-board discharging apparatus 300 shown in FIG. 12 may supply power to the current-using equipment by using the to-be-charged device.

In a specific implementation, the current-using equipment may be an on-board current-using equipment, or may be another power battery. The on-board discharging apparatus 300 shown in FIG. 12 may supply power to on-board current-using equipment (vehicle-to-load, V2L) or supply power to another power battery (vehicle-to-vehicle, V2V).

For example, the current-using equipment may be on-board current-using equipment such as an induction cooker or an electric rice cooker, and the to-be-charged device may be a power battery. In this case, when the power battery is discharged, a direct current of 90 V to 400 V may be output, and a direct current output by the power battery is output to the AC/DC conversion circuit 302 and the PFC circuit 303 after the DC/DC conversion circuit 301 performs voltage adjustment processing. The AC/DC conversion circuit 302 and the PFC circuit 303 separately convert a direct current output by the DC/DC conversion circuit 301, and output an alternating current of 220 V, so that the device such as the induction cooker or the electric rice cooker uses the alternating current of 220 V. After the DC/DC conversion circuit 301 performs voltage adjustment processing, voltages output by the AC/DC conversion circuit 302 and the PFC circuit 303 can meet a rated voltage requirement of the device such as the induction cooker or the electric rice cooker.

For example, the current-using equipment and the to-be-charged device may be power batteries in two electric vehicles respectively, where an electric capacity of the to-be-charged device is greater than an electric capacity of the current-using equipment. In this case, the to-be-charged device may charge the current-using equipment by using the on-board discharging apparatus 300. When the to-be-charged device is discharged, the to-be-charged device may output a direct current of 90 V to 400 V, the direct current output by the to-be-charged device is output to the AC/DC conversion circuit 302 and the PFC circuit 303 after the DC/DC conversion circuit 301 performs voltage adjustment processing, and the AC/DC conversion circuit 302 and the PFC circuit 303 separately convert the direct current output by the DC/DC conversion circuit 301 and output an alternating current, to charge a power battery of another electric vehicle.

It should be understood that if the AC/DC conversion circuit 302 and the PFC circuit 303 directly convert the fourth direct current voltage output by the to-be-charged device, an output voltage possibly cannot meet a voltage requirement of the current-using equipment. Therefore, the DC/DC conversion circuit 301 may perform rectification and voltage adjustment on the fourth direct current voltage, and output the fifth direct current voltage. Then, the AC/DC conversion circuit 302 and the PFC circuit 303 perform conversion processing on the fifth direct current voltage, to output a second alternating current voltage available to the current-using equipment.

In actual application, the on-board discharging apparatus 300 may be fixed to the electric vehicle. The current-using equipment may be connected to the on-board discharging apparatus 300 through a fixed interface on the electric vehicle. For example, a power plug of a device such as an induction cooker or a rice cooker may be directly plugged into the fixed interface, so that a power battery supplies power to the induction cooker or the rice cooker. In another implementation, the on-board discharging apparatus 300 may be flexibly disposed and removable. In other words, a fixed interface is disposed on the electric vehicle, to connect the on-board discharging apparatus 300 and the to-be-charged device. In this case, the on-board discharging apparatus 300 may be considered as an apparatus independent of the electric vehicle.

In a specific implementation, the DC/DC conversion circuit 301, the AC/DC conversion circuit 302, and the PFC circuit 303 may include components such as a switching transistor, a diode, an inductor, and a capacitor. Operating states of the DC/DC conversion circuit 301, the AC/DC conversion circuit 302, and the PFC circuit 303 may be implemented by adjusting operating states of these components (for example, the switching transistor).

In this application, a controller may be used to adjust the foregoing operating states. In other words, the on-board discharging apparatus 300 may further include a controller. The controller is configured to: control the DC/DC conversion circuit 301 to convert the fourth direct current voltage into the fifth direct current voltage, control the AC/DC conversion circuit 302 to convert the fifth direct current voltage into the first pulsating direct current voltage, and control the PFC circuit 303 to convert the fifth direct current voltage into the second pulsating direct current voltage. In this case, the on-board discharging apparatus 300 supplies power to the current-using equipment.

If a switching transistor in each circuit of the on-board discharging apparatus 300 is a MOS transistor, the controller may be connected to a gate of the MOS transistor, to control conduction of the MOS transistor, so that the on-board discharging apparatus 300 supplies power to the current-using equipment. If a switching transistor in each circuit of the on-board discharging apparatus 300 is a BJT, the controller may be connected to a base of the BJT, to control conduction of the BJT, so that the on-board discharging apparatus 300 supplies power to the current-using equipment.

In a specific implementation, the controller may be any one of a micro control unit MCU, a central processing unit CPU, and a digital signal processor DSP. Certainly, a specific form of the controller is not limited to the foregoing examples.

The following describes specific structures of the DC/DC conversion circuit 301, the AC/DC conversion circuit 302, and the PFC circuit 303 of the on-board discharging apparatus 300.

1. DC/DC Conversion Circuit 301

The DC/DC conversion circuit 301 may include a second H-bridge rectifier circuit, an isolation transformer, and a third H-bridge rectifier circuit, a primary-side winding of the isolation transformer is coupled to the second H-bridge rectifier circuit, and a secondary-side winding of the isolation transformer is coupled to the third H-bridge rectifier circuit.

The third H-bridge rectifier circuit includes a switching transistor and is configured to adjust the fourth direct current voltage. The second H-bridge rectifier circuit includes a switching transistor and is configured to: rectify the adjusted fourth direct current voltage, and output the fifth direct current voltage to the AC/DC conversion circuit and the PFC circuit.

In this embodiment of this application, the DC/DC conversion circuit 301 may use an existing structure, that is, includes two H-bridge rectifier circuits and one isolation transformer. A first bridge arm of the second H-bridge rectifier circuit may be used as the first direct current terminal of the DC/DC conversion circuit 301, and is connected to two terminals of a second bus bar in the AC/DC conversion circuit 302. A second bridge arm of the second H-bridge rectifier circuit may be used as the second direct current terminal of the DC/DC conversion circuit 301, and is connected to two terminals of a first bus bar in the PFC circuit 303. An input terminal of the third H-bridge rectifier circuit may be connected to the to-be-charged device (in this case, the to-be-charged device outputs the fourth direct current voltage).

The DC/DC conversion circuit 301 may perform voltage adjustment and rectification processing on the fourth direct current voltage output by the to-be-charged device, and may further isolate the current-using equipment and the to-be-charged device.

For example, a structure of the DC/DC conversion circuit 301 may be shown in FIG. 9. In FIG. 9, A and B are used as first direct current terminals, C and D are used as second direct current terminals, E and F are used as third direct current terminals, a MOS transistor Q1/Q2/Q3/Q4 forms the second H-bridge rectifier circuit, a MOS transistor Q5/Q6/Q7/Q8 forms the third H-bridge rectifier circuit, and L, C1, and T form the isolation transformer. L and T each may be a discrete structure, or L and T may be magnetically integrated.

When the on-board discharging apparatus 300 is configured to supply power to the current-using equipment, E and F are used as third direct current terminals, receive the fourth direct current voltage output by the to-be-charged device, and perform voltage adjustment and rectification processing on the fourth direct current voltage; A and B are used as first direct current terminals, and are configured to output the fifth direct current voltage to the AC/DC conversion circuit 302; and C and D are used as second direct current terminals, and are configured to output the fifth direct current voltage to the PFC circuit 303.

2. AC/DC Conversion Circuit 302

The alternating current terminal of the AC/DC conversion circuit 302 may be a single-phase alternating current terminal.

As shown in FIG. 4, the AC/DC conversion circuit 302 includes a conversion unit and a second bus bar. An input terminal of the conversion unit is the alternating current terminal of the AC/DC conversion circuit 302, a first output terminal of the conversion unit is connected to a positive terminal of the second bus bar, a second output terminal is connected to a negative terminal of the second bus bar, the positive terminal of the second bus bar is connected to a first endpoint of the first direct current terminal of the DC/DC conversion circuit 301, and the negative terminal of the second bus bar is connected to a second endpoint of the first direct current terminal of the DC/DC conversion circuit 301.

The conversion unit is configured to convert the fifth direct current voltage into the first pulsating direct current voltage.

The second bus bar is configured to: receive the fifth direct current voltage output by the first direct current terminal of the DC/DC conversion circuit 301, stabilize a voltage value of the fifth direct current voltage in a fixed numerical interval, and transfer the stable voltage value to the conversion unit.

The following provides a specific structure of the conversion unit.

The conversion unit includes a first H-bridge rectifier circuit, configured to convert the fifth direct current voltage into a sixth direct current voltage.

In an implementation, the first H-bridge rectifier circuit includes a third switching transistor, a fourth switching transistor, a second diode, and a third diode.

The third switching transistor is cross-connected between the alternating current terminal of the AC/DC conversion circuit 302 and the positive terminal of the second bus bar, the fourth switching transistor is cross-connected between the alternating current terminal of the AC/DC conversion circuit 302 and the negative terminal of the second bus bar, the second diode is cross-connected between the alternating current terminal of the AC/DC conversion circuit 302 and the positive terminal of the second bus bar, and the third diode is cross-connected between the alternating current terminal of the AC/DC conversion circuit 302 and the negative terminal of the second bus bar.

For ease of understanding, the following provides a specific example of the structure of the conversion unit.

FIG. 6 is a schematic diagram of a structure of a conversion unit according to an embodiment of this application. In FIG. 6, MOS transistors Q1 and Q2 form a first rectifier bridge arm, diodes D1 and D2 form a second rectifier bridge arm, C1 may be considered as the second bus bar, Va may be considered as a first alternating current endpoint of the alternating current terminal of the AC/DC conversion circuit 302, Vb may be considered as a second alternating current endpoint of the alternating current terminal of the AC/DC conversion circuit 302, and the first alternating current endpoint and the second alternating current endpoint are connected to the two output terminals of the current-using equipment.

When the conversion unit shown in FIG. 6 supplies power to the current-using equipment, Va and Vb are used as output terminals, A and B are used as input terminals, the first rectifier bridge arm is used to control energy to be transmitted from a right side to a left side, and a direct current input from the right side is converted into a direct current for outputting.

Certainly, the foregoing descriptions of the structure of the conversion unit are merely an example. In an actual application, the conversion unit may alternatively be of another structure. For example, the first H-bridge rectifier unit included in the conversion unit may be a single-phase fully-controlled bridge circuit, and is configured to implement single-phase inversion.

3. PFC Circuit 303

As shown in FIG. 7, the PFC circuit may include a boost circuit and a first bus bar, an input terminal of the boost circuit is an input terminal of the PFC circuit, a first output terminal of the boost circuit is connected to a positive terminal of the first bus bar, a second output terminal is connected to a negative terminal of the first bus bar, the positive terminal of the first bus bar is connected to a first endpoint of the second direct current terminal of the DC/DC conversion circuit 301, and the negative terminal of the first bus bar is connected to a second endpoint of the second direct current terminal of the DC/DC conversion circuit 301.

The boost circuit is configured to convert the fifth direct current voltage into the second pulsating direct current voltage.

The first bus bar is configured to: receive the fifth direct current voltage output by the second direct current terminal of the DC/DC conversion circuit 301, stabilize a voltage value of the fifth direct current voltage in a fixed numerical interval, and transfer the stable voltage value to the boost circuit.

The following provides a specific structure of the boost circuit.

The boost circuit may include an energy storage inductor, a first diode, a first switching transistor, and a second switching transistor.

A first terminal of the energy storage inductor is connected to the alternating current terminal of the AC/DC conversion circuit 302, the first diode is cross-connected between the alternating current terminal of the AC/DC conversion circuit 302 and the positive terminal of the first bus bar, a cathode of the first diode is connected to the positive terminal of the first bus bar, the first switching transistor is cross-connected between a second terminal of the energy storage inductor and the positive terminal of the first bus bar, and the second switching transistor is cross-connected between the second terminal of the energy storage inductor and the negative terminal of the first bus bar.

For ease of understanding, the following provides a specific example of the structure of the boost circuit.

FIG. 8 is a schematic diagram of a structure of a boost circuit according to an embodiment of this application. In FIG. 8, L1 may be considered as the energy storage inductor, D1 may be considered as the first diode, Q1 may be considered as the first switching transistor, Q2 may be considered as the second switching transistor, C1 may be considered as the first bus bar, Va may be considered as a first alternating current endpoint of the alternating current terminal of the PFC circuit 303, and Vb may be considered as a second alternating current endpoint of the alternating current terminal of the PFC circuit 303.

When the boost circuit shown in FIG. 8 supplies power to the current-using equipment, A and B are used as input terminals, Va and Vb are used as output terminals, a rectifier bridge arm including Q1 and Q2 is used to transmit energy from right to left, and a direct current input from a right side is converted into a direct current for outputting.

With reference to the foregoing description, for example, an on-board discharging apparatus provided in an embodiment of this application may be shown in FIG. 10.

In the DC/DC conversion circuit, a switching transistor Q5/Q6/Q7/Q8 forms the second H-bridge rectifier circuit, a drain of Q5 is connected to a positive terminal of C1, a source of Q6 is connected to a negative terminal of C1, a drain of Q7 is connected to a positive terminal of C2, a source of Q8 is connected to a negative terminal of C2 (equivalent to grounding), an intermediate node that connects Q5 and Q6 is connected to C3, C3 is connected to L2, L2 is connected to a primary-side winding of T2, and an intermediate node between Q7 and Q8 is connected to the other terminal of the primary-side winding of T2. A MOS transistor Q9/Q10/Q11/Q12 forms an H circuit, an intermediate node that connects Q9 and Q10 is connected to one terminal of a secondary-side winding of T2, an intermediate node that connects Q10 and Q12 is connected to the other terminal of the secondary-side winding of T2, a drain of Q9 and a drain of Q11 are connected to a positive electrode of a battery, and a source of Q10 and a source of Q12 are connected to a negative electrode of the battery.

The AC/DC conversion circuit includes diodes D1 and D2, MOS transistors Q1 and Q2, and direct current bus bar C1. An alternating current side is connected to the current-using equipment, and Q1, Q2, D1, and D2 form the first H-bridge rectifier circuit. A drain of Q1 and a cathode of D1 are connected to a positive terminal of C1, and a source of Q2 and an anode of D2 are connected to a negative terminal of C1. Gates of the MOS transistors are all connected to an external control circuit (or a controller). The control circuit implements a corresponding function of the on-board discharging apparatus by controlling conduction of the MOS transistors.

The PFC circuit includes a diode D3, MOS transistors Q3 and Q4, an inductor L1, and a direct current bus bar C2. A drain of Q3 and a cathode of D3 are connected to a positive terminal of C2, a source is connected to a first terminal of L1 and a drain of Q4, and a source of Q4 is connected to a negative terminal of C2. Gates of the MOS transistors are all connected to an external control circuit (or a controller). The control circuit implements a corresponding function of the on-board discharging apparatus by controlling conduction of the MOS transistors.

It is easily learned that the alternating current terminal of the AC/DC conversion circuit is connected to the current-using equipment, the alternating current terminal of the PFC circuit is connected to the alternating current terminal of the AC/DC conversion circuit, and the direct current terminal of the AC/DC conversion circuit and the direct current terminal of the PFC circuit are respectively connected to the first direct current terminal and the second direct current terminal of the DC/DC conversion circuit.

When the on-board discharging apparatus shown in FIG. 10 is used to supply power to the current-using equipment, Va and Vb are used as output terminals of the on-board discharging apparatus and are connected to the current-using equipment, and C and D are used as input terminals of the on-board discharging apparatus and are connected to the power battery.

The power battery is connected to the DC/DC conversion circuit, and the DC/DC conversion circuit is connected to the AC/DC conversion circuit and the PFC circuit. In the DC/DC conversion circuit, Q9/Q10/Q11/Q12/Q5/Q6/Q7/Q8 performs voltage adjustment and rectification on the fourth direct current voltage received from the to-be-charged device, to obtain the fifth direct current voltage. In the AC/DC conversion circuit, the rectifier bridge arm including Q1 and Q2 is configured to: rectify the fifth direct current voltage, and output the first pulsating direct current voltage. In the PFC circuit, a rectifier bridge arm including Q3 and Q4 is configured to: rectify the fifth direct current voltage, and output the second pulsating direct current voltage.

During charging of the to-be-charged device, outputs of he alternating current terminal of the AC/DC conversion circuit and the alternating current terminal of the PFC circuit complement each other, the alternating current terminal of the AC/DC conversion circuit 302 and the alternating current terminal of the PFC circuit 303 outputs the second alternating current voltage obtained by superposing the first pulsating direct current voltage and the second pulsating direct current voltage that have a same amplitude and opposite directions, to supply power to the current-using equipment.

Based on a same inventive concept, an embodiment of this application further provides an on-board charging and discharging apparatus, including an alternating current to direct current conversion circuit (AC/DC conversion circuit), a power factor correction circuit (PFC circuit), and a direct current to direct current conversion circuit (DC/DC conversion circuit). An alternating current terminal of the AC/DC conversion circuit is connected to an alternating current terminal of the PFC circuit, a direct current terminal of the AC/DC conversion circuit is connected to a first direct current terminal of the DC/DC conversion circuit, and a direct current terminal of the PFC circuit is connected to a second direct current terminal of the DC/DC conversion circuit.

The alternating current terminal of the AC/DC conversion circuit is connected to an alternating current power supply or current-using equipment, and a third direct current terminal of the DC/DC conversion circuit is connected to a to-be-charged device.

When the on-board charging apparatus is configured to charge the to-be-charged device, the AC/DC conversion circuit is configured to convert, into a first direct current voltage, a first component of a first alternating current voltage received by the AC/DC conversion circuit; the PFC circuit is configured to convert a second component of the first alternating current voltage into a second direct current voltage; and the DC/DC conversion circuit is configured to: convert the first direct current voltage and the second direct current voltage into a third direct current voltage, and output the third direct current voltage to the to-be-charged device.

When the on-board charging apparatus is configured to discharge electricity to the current-using equipment, the DC/DC conversion circuit is configured to: receive a fourth direct current voltage output by the to-be-charged device, convert the fourth direct current voltage into a fifth direct current voltage, and output the fifth direct current voltage to the AC/DC conversion circuit and the PFC circuit; the AC/DC conversion circuit is configured to: convert the fifth direct current voltage into a first pulsating direct current voltage, and output the first pulsating direct current voltage to the current-using equipment; the PFC circuit is configured to: convert the fifth direct current voltage into a second pulsating direct current voltage, and output the second pulsating direct current voltage to the current-using equipment; and the first pulsating direct current voltage and the second pulsating direct current voltage form a second alternating current voltage. It can be understood that, for a circuit structure design of the on-board charging and discharging apparatus, refer to related designs in FIG. 2 to FIG. 13. Details are not described herein again.

Figure 13:
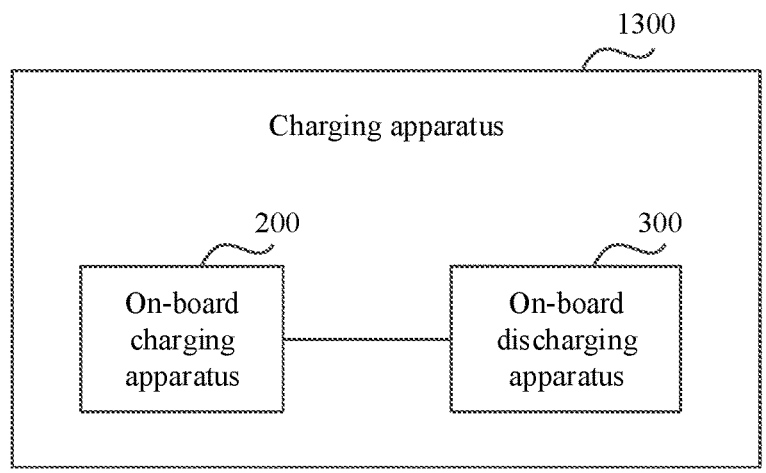
FIG. 13 is a schematic diagram of a structure of a charging apparatus according to an embodiment of this application.

Based on a same inventive concept, an embodiment of this application further provides a charging system. Referring to FIG. 13, a charging system 1300 includes the on-board charging apparatus 200 and/or the on-board discharging apparatus 300.

The charging system 1300 is connected between a wind turbine generator system in a wind power generation system and a battery pack, and the charging system 1300 is configured to charge the battery pack by using an alternating current generated by the wind turbine generator system.

In a possible design, the charging system 1300 is connected between a photovoltaic cell panel in a photovoltaic power generation system and a battery pack, and the charging system 1300 is configured to charge the battery pack by using an alternating current generated by the photovoltaic cell panel.

In a possible design, the charging system 1300 is connected between an input terminal of an uninterruptible power system and a storage battery, and the charging system 1300 is configured to charge the storage battery by using an alternating current received by the uninterruptible power system.

Figure 14:
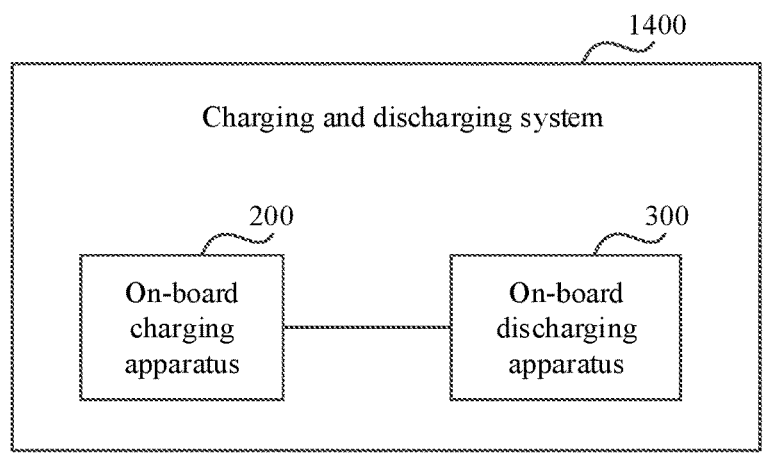
FIG. 14 is a schematic diagram of a structure of a charging and discharging system according to an embodiment of this application.

Based on a same inventive concept, an embodiment of this application further provides a charging and discharging system. Referring to FIG. 14, a charging and discharging system 1400 includes the on-board charging apparatus 200 and/or the on-board discharging apparatus 300.

Optionally, the charging and discharging system 1400 further includes an alternating current power supply. The alternating current power supply is configured to supply power to the on-board charging apparatus 200. In other words, the alternating current power supply may output a first alternating current voltage.

Optionally, the charging and discharging system 1400 further includes a to-be-charged device, and the on-board charging apparatus 200 is configured to charge the to-be-charged device.

The to-be-charged device may be a power battery. For example, the to-be-charged device may be a power battery such as a nickel metal hydride battery, a lithium battery, or a lead-acid battery. When discharging, the charging and discharging system may charge a load such as an induction cooker, a rice cooker, a mobile phone, or another terminal.

Optionally, the charging and discharging system 1400 further includes current-using equipment, and the on-board discharging apparatus 300 is configured to supply power to the current-using equipment.

Obviously, a person skilled in the art can make various modifications and variations to this application without departing from the scope of this application. In this way, if these modifications and variations of this application fall within the scope of the claims of this application and their equivalents, this application is intended to include such modifications and variations.

Figure 15:
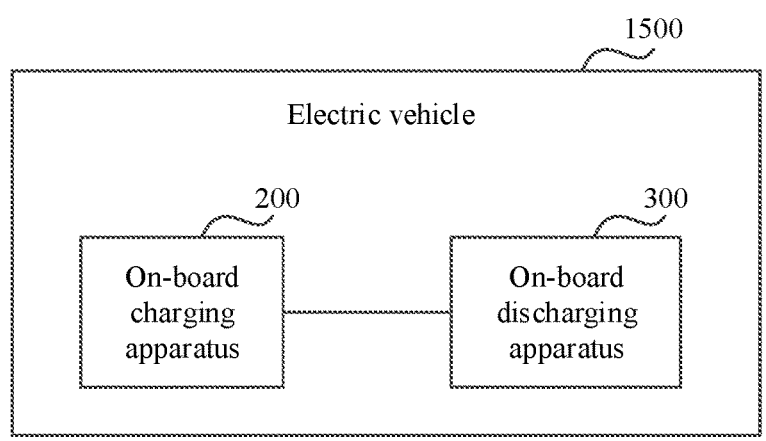
FIG. 15 is a schematic diagram of a structure of an electric vehicle according to an embodiment of this application.

Based on a same inventive concept, an embodiment of this application further provides an electric vehicle. Referring to FIG. 15, an electric vehicle 1500 includes the on-board charging apparatus 200 and/or the on-board discharging apparatus 300.

Optionally, the electric vehicle 1500 further includes a power battery pack, the power battery pack is configured to provide electric energy for the electric vehicle 1500, and the on-board charging apparatus 200 is configured to charge the power battery pack.

It should be understood that the solutions provided in this application may be applied to charging and discharging solutions of different vehicles, and include but are not limited to different types of vehicles such as a pure electric vehicle (Pure EV/Battery EV), a hybrid electric vehicle (HEV), and an electric vehicle. In addition, the apparatus provided in this application is not only applied to the vehicle field, but may also be applied to fields such as the wind power generation field and the photovoltaic power generation.

It should be noted that "a plurality of" in this application refers to two or more.

The term "and/or" in this application describes an association relationship for describing associated objects and represents that three relationships may exist. For example, A and/or B may represent the following three cases: Only A exists, both A and B exist, and only B exists. The character "/" generally indicates an "or" relationship between the associated objects.

The connection in this application describes a connection relationship between two objects, and may represent two connection relationships. For example, that A is connected to B may represent two cases: A is directly connected to B, and A is connected to B by using C.

In addition, it should be understood that in the description of this application, terms such as "first" and "second" are merely used for distinguishing and description, but should not be understood as indicating or implying relative importance, or should not be understood as indicating or implying a sequence.

It should be understood that a system structure and a service scenario provided in the embodiments of this application are mainly intended to explain some possible implementations of the technical solutions in this application, and should not be construed as a unique limitation on the technical solutions in this application. A person of ordinary skill in the art may know that as a system evolves and a new service scenario emerges, the technical solutions provided in this application are also applicable to a same or similar technical problem.

What is claimed is:

1. An on-board charging apparatus, comprising:
   an alternating current to direct current conversion circuit (AC/DC conversion circuit);
   a power factor correction (PFC) circuit; and
   a direct current to direct current conversion circuit (DC/DC conversion circuit),
   wherein an alternating current terminal of the AC/DC conversion circuit is connected to an alternating current terminal of the PFC circuit, a direct current terminal of the AC/DC conversion circuit is connected to a first direct current terminal of the DC/DC conversion circuit, and a direct current terminal of the PFC circuit is connected to a second direct current terminal of the DC/DC conversion circuit;
   wherein the AC/DC conversion circuit is configured to: receive a first alternating current voltage at the alternating current terminal of the AC/DC conversion circuit, and convert a first component of the first alternating current voltage into a first direct current voltage;
   wherein the PFC circuit is configured to: convert a second component of the first alternating current voltage into a second direct current voltage; and
   wherein the DC/DC conversion circuit is configured to: convert the first direct current voltage and the second direct current voltage into a third direct current voltage, and output the third direct current voltage to a to-be-charged device.

2. The on-board charging apparatus according to claim 1, wherein the PFC circuit comprises a boost circuit and a first bus bar;
   wherein an input terminal of the boost circuit is the alternating current terminal of the PFC circuit, a first output terminal of the boost circuit is connected to a positive terminal of the first bus bar, a second output terminal is connected to a negative terminal of the first bus bar, the positive terminal of the first bus bar is connected to a first endpoint of the second direct current terminal of the DC/DC conversion circuit, and the negative terminal of the first bus bar is connected to a second endpoint of the second direct current terminal of the DC/DC conversion circuit;
   wherein the boost circuit is configured to: convert the second component of the first alternating current voltage into the second direct current voltage; and
   wherein the first bus bar is configured to: receive the second direct current voltage, and transmit the second direct current voltage to the DC/DC conversion circuit.

3. The on-board charging apparatus according to claim 2, wherein the boost circuit comprises an energy storage inductor, a first diode, a first switching transistor, and a second switching transistor; and
   wherein a first terminal of the energy storage inductor is connected to the alternating current terminal of the AC/DC conversion circuit, the first diode is cross-connected between the alternating current terminal of the AC/DC conversion circuit and the positive terminal of the first bus bar, a cathode of the first diode is connected to the positive terminal of the first bus bar, the first switching transistor is cross-connected between a second terminal of the energy storage inductor and the positive terminal of the first bus bar, and the second switching transistor is cross-connected between the second terminal of the energy storage inductor and the negative terminal of the first bus bar.

4. The on-board charging apparatus according to claim 1, wherein the AC/DC conversion circuit comprises a conversion sub-circuit and a second bus bar, an input terminal of the conversion sub-circuit is the alternating current terminal of the AC/DC conversion circuit, a first output terminal of the conversion sub-circuit is connected to a positive terminal of the second bus bar, a second output terminal is connected to a negative terminal of the second bus bar, the positive terminal of the second bus bar is connected to a first endpoint of the first direct current terminal of the DC/DC conversion circuit, and the negative terminal of the second bus bar is connected to a second endpoint of the first direct current terminal of the DC/DC conversion circuit;
   wherein the conversion sub-circuit is configured to: convert the first component of the first alternating current voltage into the first direct current voltage; and
   wherein the second bus bar is configured to: receive the first direct current voltage, and transmit the first direct current voltage to the DC/DC conversion circuit.

5. The on-board charging apparatus according to claim 4, wherein the conversion sub-circuit comprises a first H-bridge rectifier circuit configured to convert the first component of the first alternating current voltage into the first direct current voltage.

6. The on-board charging apparatus according to claim 5,
wherein the first H-bridge rectifier circuit comprises a third switching transistor, a fourth switching transistor, a second diode, and a third diode; and
wherein the third switching transistor is cross-connected between the alternating current terminal of the AC/DC conversion circuit and the positive terminal of the second bus bar, the fourth switching transistor is cross-connected between the alternating current terminal of the AC/DC conversion circuit and the negative terminal of the second bus bar, the second diode is cross-connected between the alternating current terminal of the AC/DC conversion circuit and the positive terminal of the second bus bar, and the third diode is cross-connected between the alternating current terminal of the AC/DC conversion circuit and the negative terminal of the second bus bar.

7. The on-board charging apparatus according to claim 1,
wherein the DC/DC conversion circuit comprises a second H-bridge rectifier circuit, an isolation transformer, and a third H-bridge rectifier circuit;
wherein a primary-side winding of the isolation transformer is coupled to the second H-bridge rectifier circuit, and a secondary-side winding of the isolation transformer is coupled to the third H-bridge rectifier circuit;
wherein the second H-bridge rectifier circuit is configured to: adjust the first direct current voltage and the second direct current voltage; and
wherein the third H-bridge rectifier circuit is configured to: rectify the adjusted first direct current voltage and the adjusted second direct current voltage, and output the third direct current voltage to the to-be-charged device.

8. The on-board charging apparatus according to claim 1, further comprising a controller, configured to:
control the AC/DC conversion circuit to convert the first component into the first direct current voltage;
control the PFC circuit to convert the second component into the second direct current voltage; and
control the DC/DC conversion circuit to convert the first direct current voltage and the second direct current voltage into the third direct current voltage.

9. The on-board charging apparatus according to claim 1, wherein the alternating current terminal of the AC/DC conversion circuit is a single-phase alternating current terminal.

10. A charging system, comprising:
an on-board charging apparatus, comprising: an alternating current to direct current conversion circuit (AC/DC conversion circuit), a power factor correction (PFC) circuit, and a direct current to direct current conversion circuit (DC/DC conversion circuit);
wherein an alternating current terminal of the AC/DC conversion circuit is connected to an alternating current terminal of the PFC circuit, a direct current terminal of the AC/DC conversion circuit is connected to a first direct current terminal of the DC/DC conversion circuit, and a direct current terminal of the PFC circuit is connected to a second direct current terminal of the DC/DC conversion circuit;
wherein the AC/DC conversion circuit is configured to: receive a first alternating current voltage at the alternating current terminal of the AC/DC conversion circuit, and convert a first component of the first alternating current voltage into a first direct current voltage;
wherein the PFC circuit is configured to: convert a second component of the first alternating current voltage into a second direct current voltage; and
wherein the DC/DC conversion circuit is configured to: convert the first direct current voltage and the second direct current voltage into a third direct current voltage, and output the third direct current voltage to a to-be-charged device.

11. The charging system according to claim 10,
wherein the PFC circuit comprises a boost circuit and a first bus bar;
wherein an input terminal of the boost circuit is the alternating current terminal of the PFC circuit, a first output terminal of the boost circuit is connected to a positive terminal of the first bus bar, a second output terminal is connected to a negative terminal of the first bus bar, the positive terminal of the first bus bar is connected to a first endpoint of the second direct current terminal of the DC/DC conversion circuit, and the negative terminal of the first bus bar is connected to a second endpoint of the second direct current terminal of the DC/DC conversion circuit;
wherein the boost circuit is configured to: convert the second component of the first alternating current voltage into the second direct current voltage; and
wherein the first bus bar is configured to: receive the second direct current voltage, and transmit the second direct current voltage to the DC/DC conversion circuit.

12. The charging system according to claim 11,
wherein the boost circuit comprises an energy storage inductor, a first diode, a first switching transistor, and a second switching transistor; and
wherein a first terminal of the energy storage inductor is connected to the alternating current terminal of the AC/DC conversion circuit, the first diode is cross-connected between the alternating current terminal of the AC/DC conversion circuit and the positive terminal of the first bus bar, a cathode of the first diode is connected to the positive terminal of the first bus bar, the first switching transistor is cross-connected between a second terminal of the energy storage inductor and the positive terminal of the first bus bar, and the second switching transistor is cross-connected between the second terminal of the energy storage inductor and the negative terminal of the first bus bar.

13. An electric vehicle, comprising:
a power battery pack; and
an on-board charging apparatus, comprising an alternating current to direct current conversion circuit (AC/DC conversion circuit), a power factor correction (PFC) circuit, and a direct current to direct current conversion circuit (DC/DC conversion circuit);
wherein an alternating current terminal of the AC/DC conversion circuit is connected to an alternating current terminal of the PFC circuit, a direct current terminal of the AC/DC conversion circuit is connected to a first direct current terminal of the DC/DC conversion circuit, and a direct current terminal of the PFC circuit is connected to a second direct current terminal of the DC/DC conversion circuit;
wherein the AC/DC conversion circuit is configured to: receive a first alternating current voltage at the alternating current terminal of the AC/DC conversion circuit, and convert a first component of the first alternating current voltage into a first direct current voltage;

wherein the PFC circuit is configured to: convert a second component of the first alternating current voltage into a second direct current voltage; and wherein the DC/DC conversion circuit is configured to: convert the first direct current voltage and the second direct current voltage into a third direct current voltage, and output the third direct current voltage to the power battery pack.

14. The electric vehicle according to claim 13,
wherein the PFC circuit comprises a boost circuit and a first bus bar;
wherein an input terminal of the boost circuit is the alternating current terminal of the PFC circuit, a first output terminal of the boost circuit is connected to a positive terminal of the first bus bar, a second output terminal is connected to a negative terminal of the first bus bar, the positive terminal of the first bus bar is connected to a first endpoint of the second direct current terminal of the DC/DC conversion circuit, and the negative terminal of the first bus bar is connected to a second endpoint of the second direct current terminal of the DC/DC conversion circuit;
wherein the boost circuit is configured to: convert the second component of the first alternating current voltage into the second direct current voltage; and wherein the first bus bar is configured to: receive the second direct current voltage, and transmit the second direct current voltage to the DC/DC conversion circuit.

15. The electric vehicle according to claim 14,
wherein the boost circuit comprises an energy storage inductor, a first diode, a first switching transistor, and a second switching transistor;
wherein a first terminal of the energy storage inductor is connected to the alternating current terminal of the AC/DC conversion circuit, the first diode is cross-connected between the alternating current terminal of the AC/DC conversion circuit and the positive terminal of the first bus bar, a cathode of the first diode is connected to the positive terminal of the first bus bar, the first switching transistor is cross-connected between a second terminal of the energy storage inductor and the positive terminal of the first bus bar, and the second switching transistor is cross-connected between the second terminal of the energy storage inductor and the negative terminal of the first bus bar; and
wherein the power battery pack is configured to supply power to the electric vehicle, and the on-board charging apparatus is configured to charge the power battery pack.

* * * * *